(12) United States Patent
Ryu et al.

(10) Patent No.: US 10,313,909 B2
(45) Date of Patent: Jun. 4, 2019

(54) METHOD AND DEVICE FOR CELL GRANULARITY REPORTING IN WIRELESS COMMUNICATION SYSTEM

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 15/516,600

(22) PCT Filed: Oct. 5, 2015

(86) PCT No.: PCT/KR2015/010517
§ 371 (c)(1),
(2) Date: Apr. 3, 2017

(87) PCT Pub. No.: WO2016/053066
PCT Pub. Date: Apr. 7, 2016

(65) Prior Publication Data
US 2018/0206137 A1  Jul. 19, 2018

Related U.S. Application Data

(60) Provisional application No. 62/059,165, filed on Oct. 3, 2014.

(51) Int. Cl.
*H04W 24/10* (2009.01)
*H04W 4/06* (2009.01)
(Continued)

(52) U.S. Cl.
CPC .............. *H04W 24/10* (2013.01); *H04W 4/06* (2013.01); *H04W 4/70* (2018.02); *H04W 8/08* (2013.01);
(Continued)

(58) Field of Classification Search
CPC .......... H04W 24/10; H04W 4/06; H04W 8/08
See application file for complete search history.

(56) References Cited

U.S. PATENT DOCUMENTS

2008/0267109 A1* 10/2008 Wang .................. H04W 72/005
                                                                       370/312
2012/0195221 A1*  8/2012 Wang .................. H04W 72/005
                                                                       370/252

FOREIGN PATENT DOCUMENTS

KR    10-2010-0002294 A    1/2010
KR    10-2010-0100017 A    9/2010
(Continued)

*Primary Examiner* — Siming Liu
(74) *Attorney, Agent, or Firm* — Birch, Stewart, Kolasch & Birch, LLP

(57) ABSTRACT

Disclosed are a method for cell granularity reporting in a wireless communication system and a device therefor. The method for performing cell granularity reporting by a user equipment (UE) in an idle state in a wireless communication system includes receiving a cell granularity reporting configuration from a network, detecting whether a cell in which the UE is camping in the idle state is changed, and when it is detected that the cell in which the UE is camping is changed, transmitting cell change information to the network, wherein the cell granularity reporting configuration includes an indication regarding whether to receive a multimedia broadcast and multicast service (MBMS), and when the indication regarding whether an MBMS is received is activated, the UE does not perform the cell granularity reporting unless the UE receives MBMS data.

11 Claims, 23 Drawing Sheets

(51) Int. Cl.
*H04W 8/08* (2009.01)
*H04W 4/70* (2018.01)
*H04W 60/04* (2009.01)
H04W 4/021 (2018.01)
H04W 64/00 (2009.01)
H04W 68/12 (2009.01)

(52) U.S. Cl.
CPC ............ *H04W 60/04* (2013.01); *H04W 4/021* (2013.01); *H04W 64/003* (2013.01); *H04W 68/12* (2013.01)

(56) References Cited

FOREIGN PATENT DOCUMENTS

| WO | WO 2013/009127 A2 | 1/2013 |
| WO | WO 2013/113268 A1 | 8/2013 |
| WO | WO 2014/126421 A1 | 8/2014 |

\* cited by examiner

[FIG. 1]
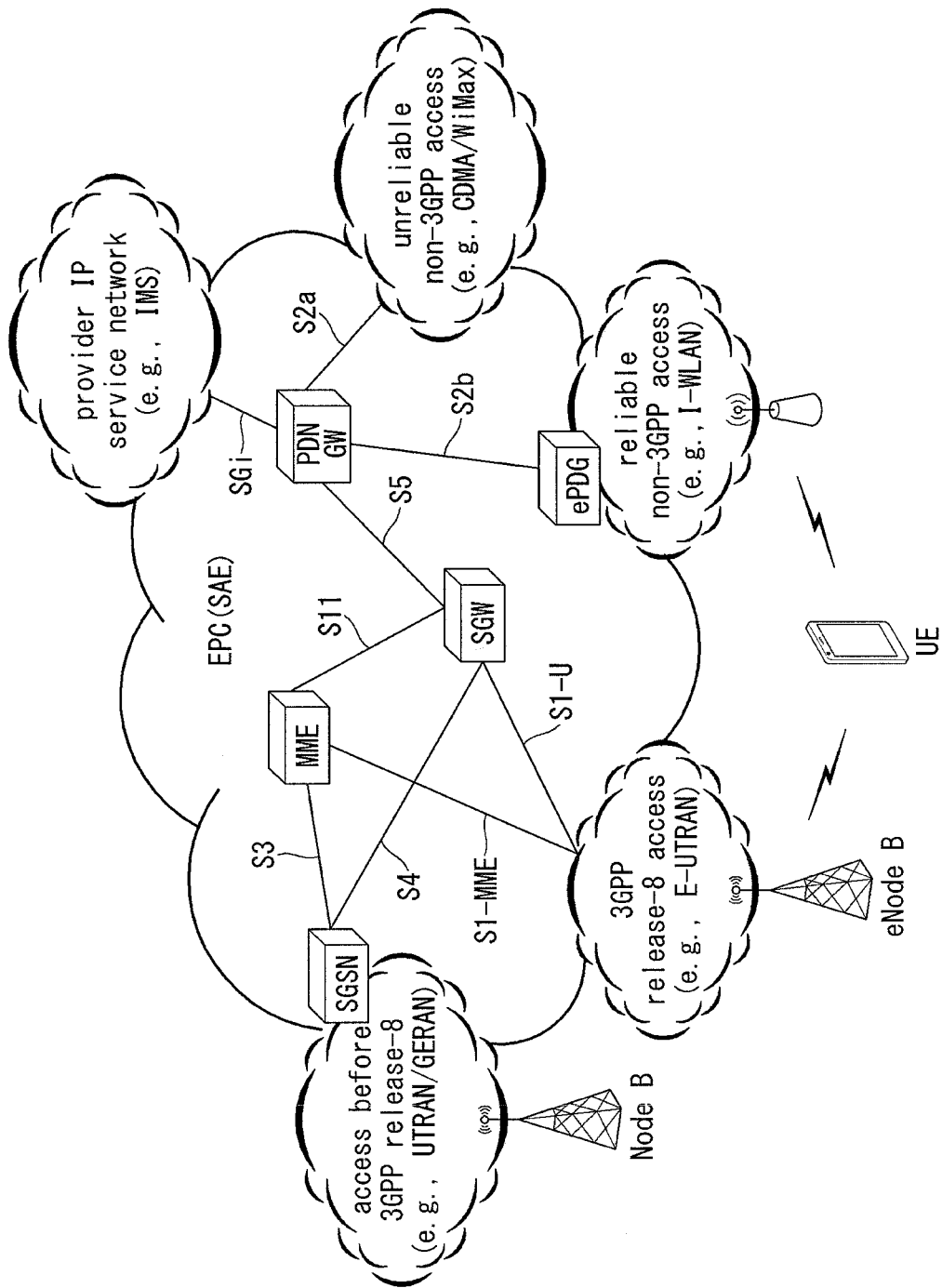

[FIG. 2]
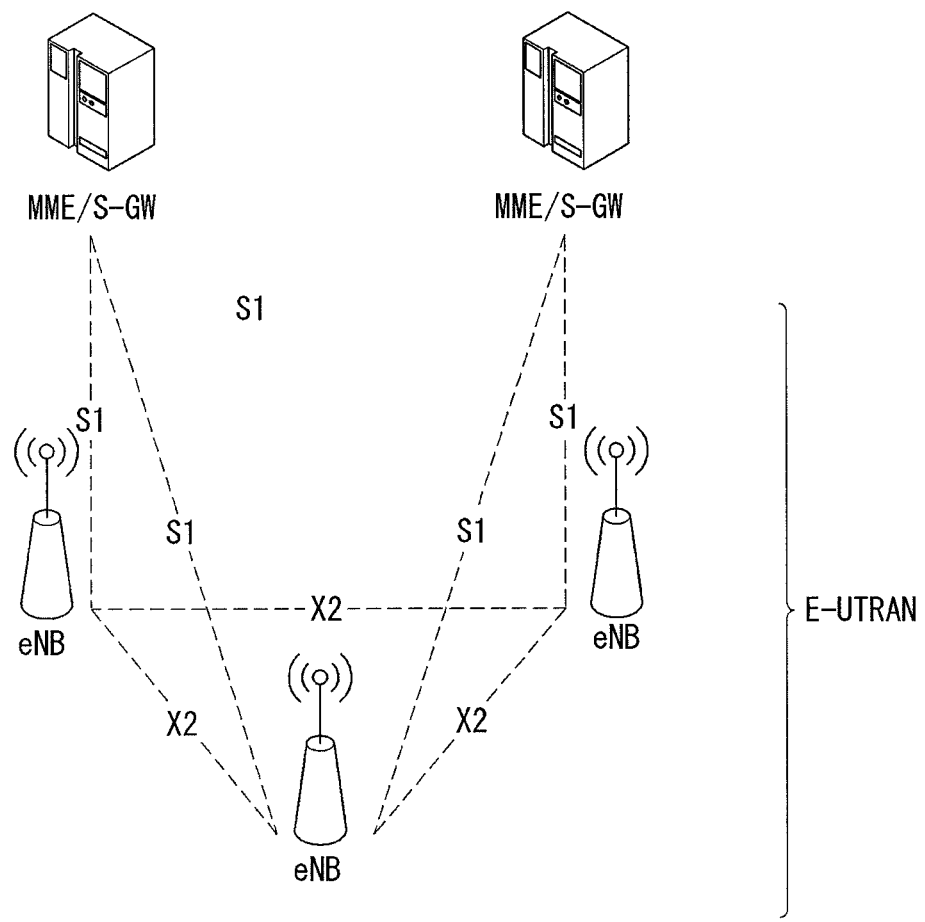

[FIG. 3]
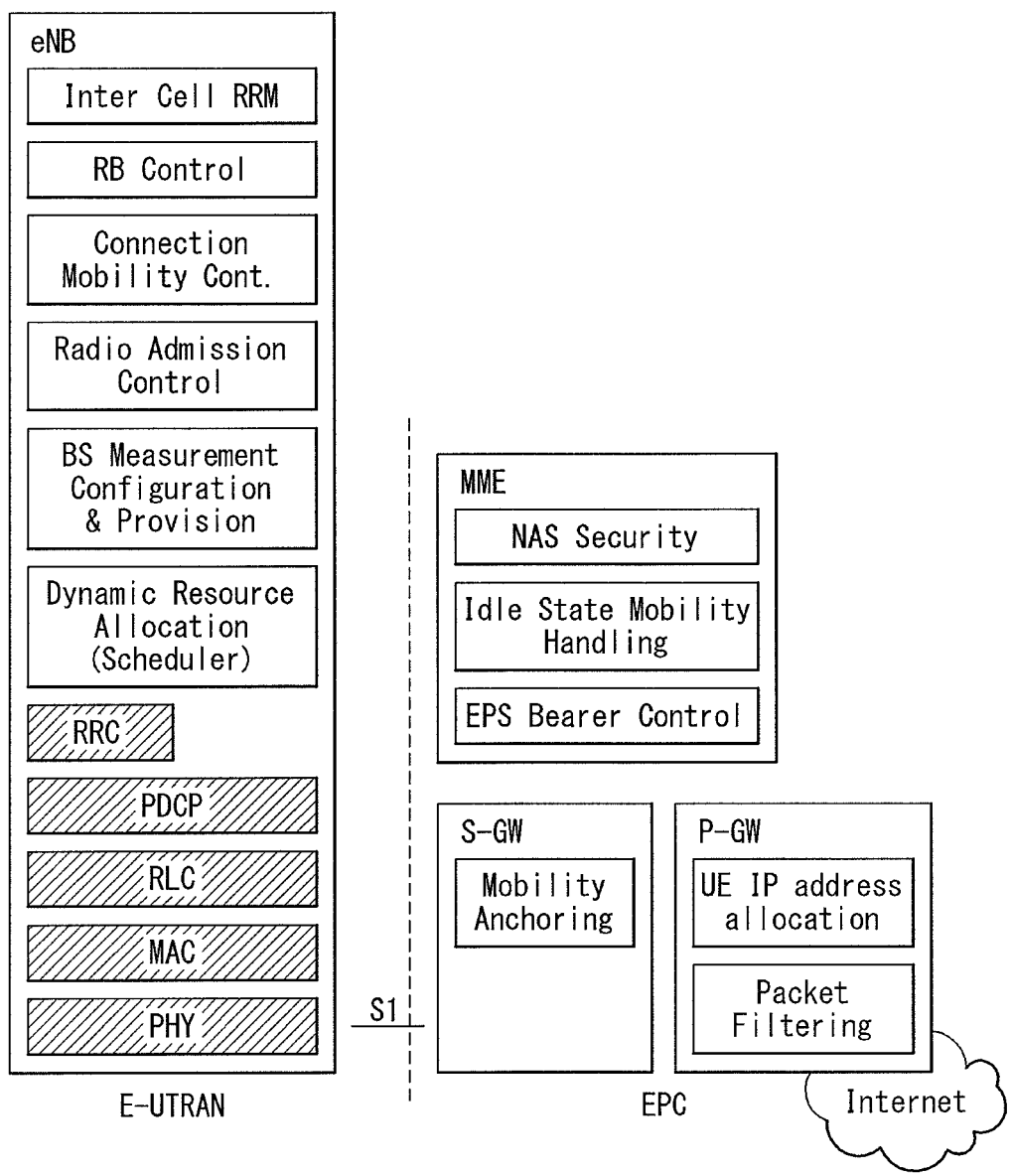

[FIG. 4]
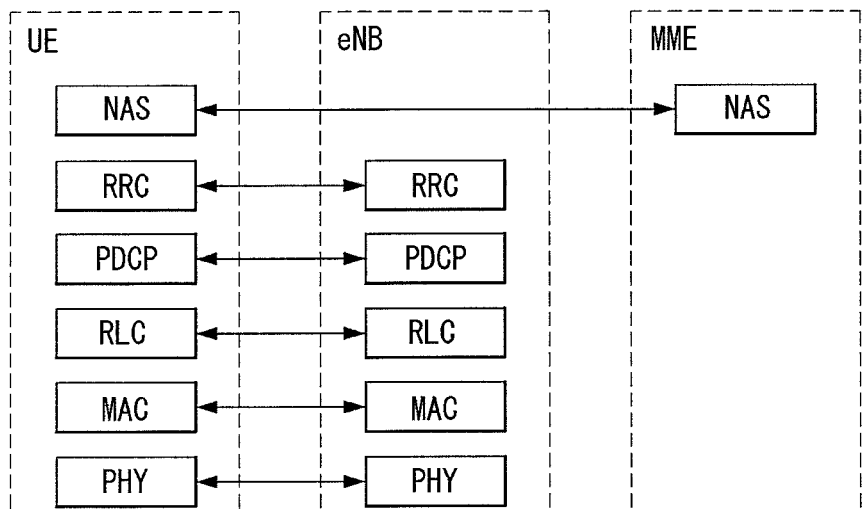
(a): control-plane protocol stack
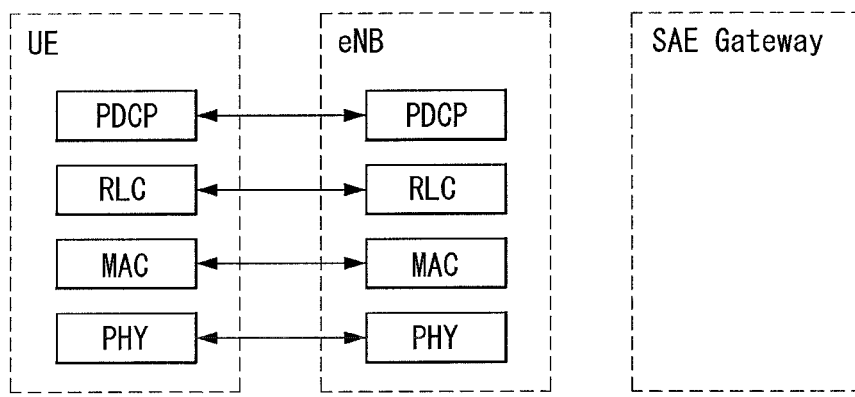
(b) user-plane protocol stack

[FIG. 5]
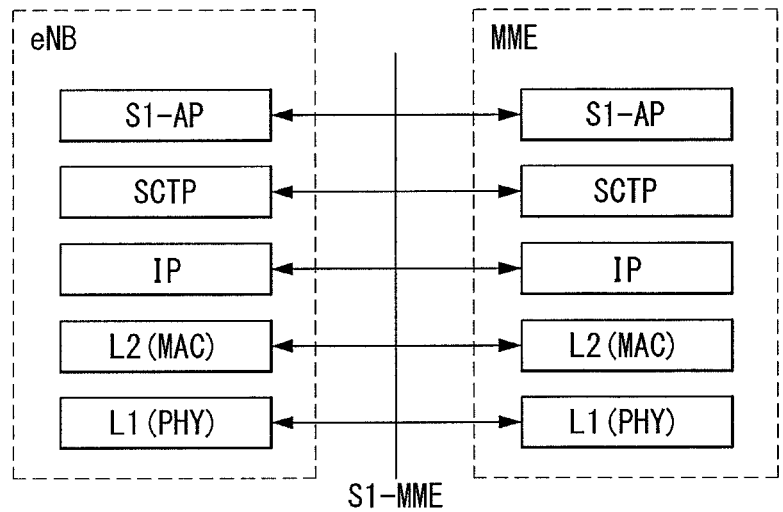
(a) control-plane protocol stack
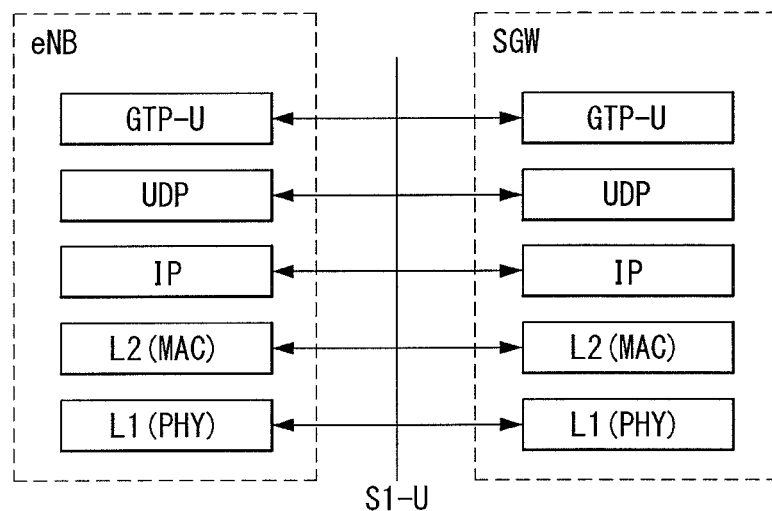
(b) user-plane protocol stack 【FIG. 6】
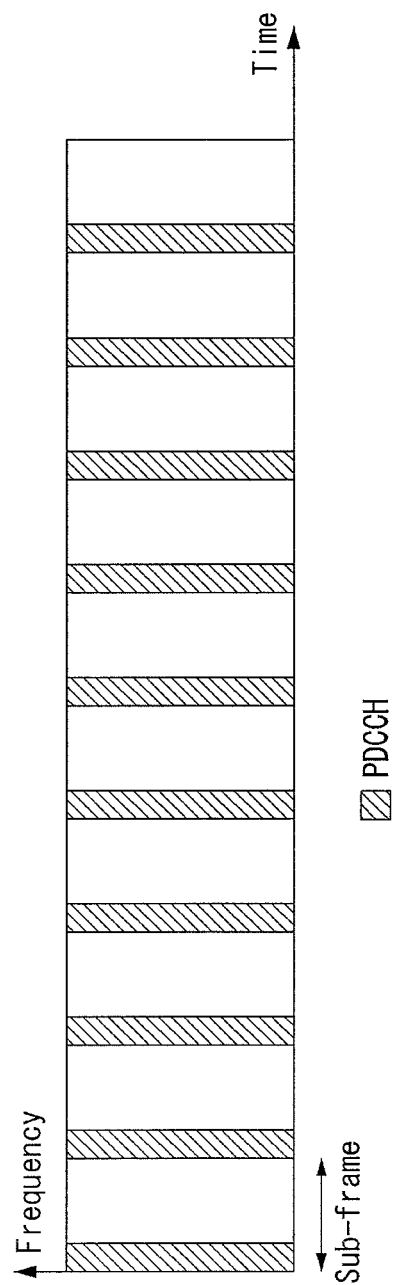

[FIG. 7]
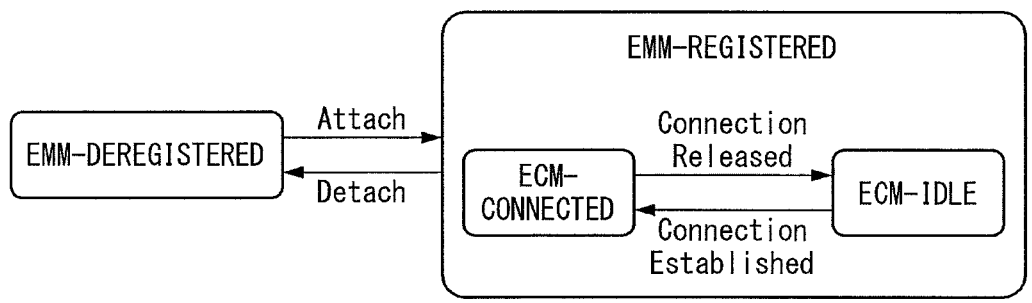
[FIG. 8]
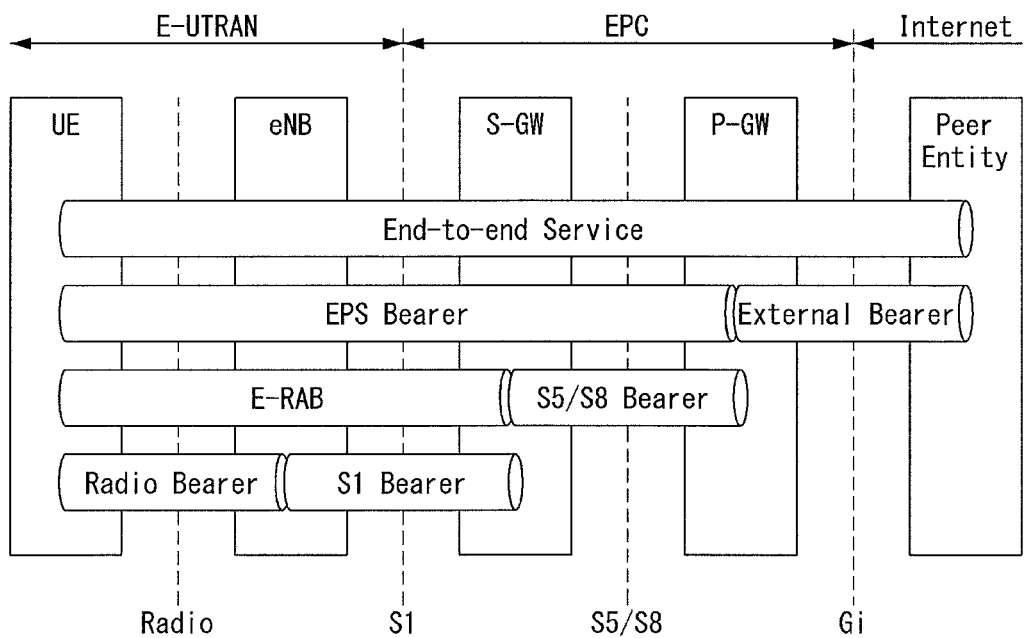

[FIG. 9]
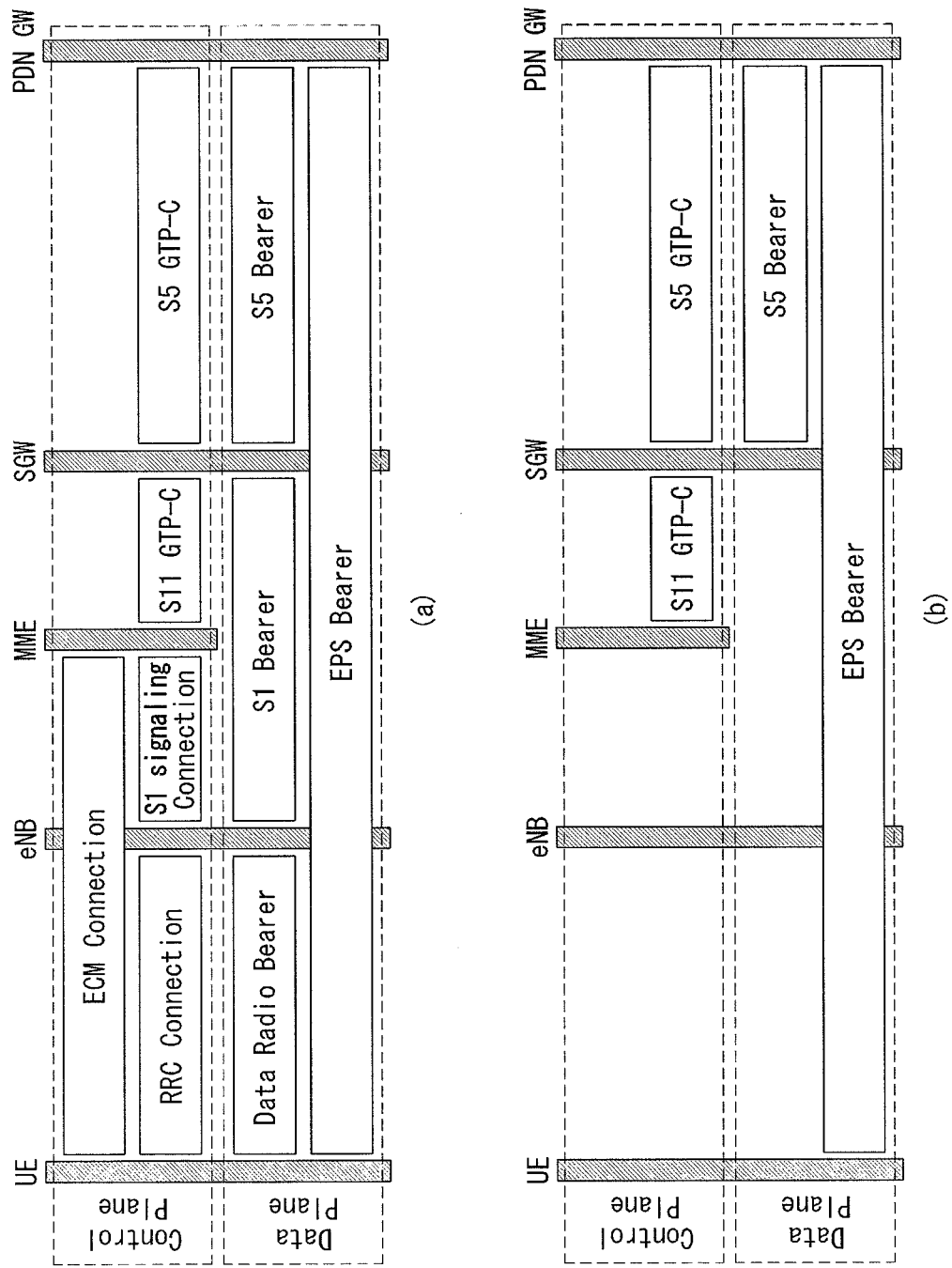

[FIG. 10]
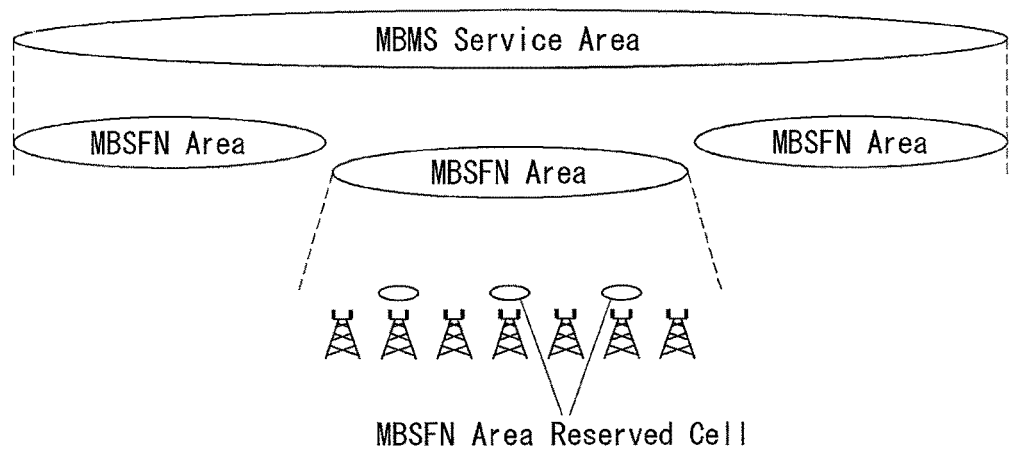
[FIG. 11]
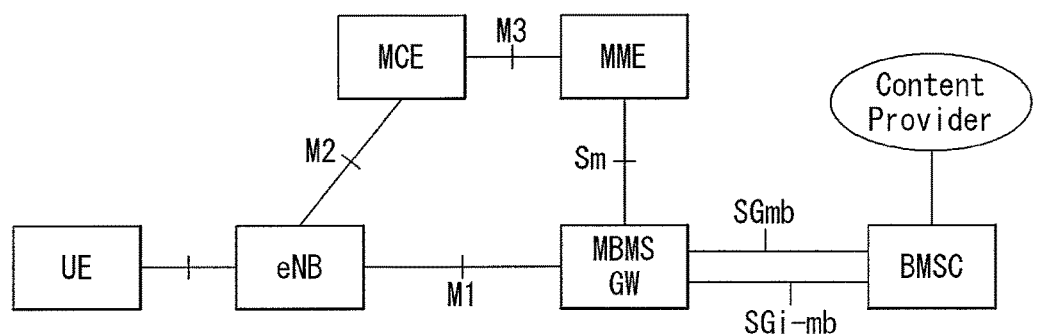

[FIG. 12]
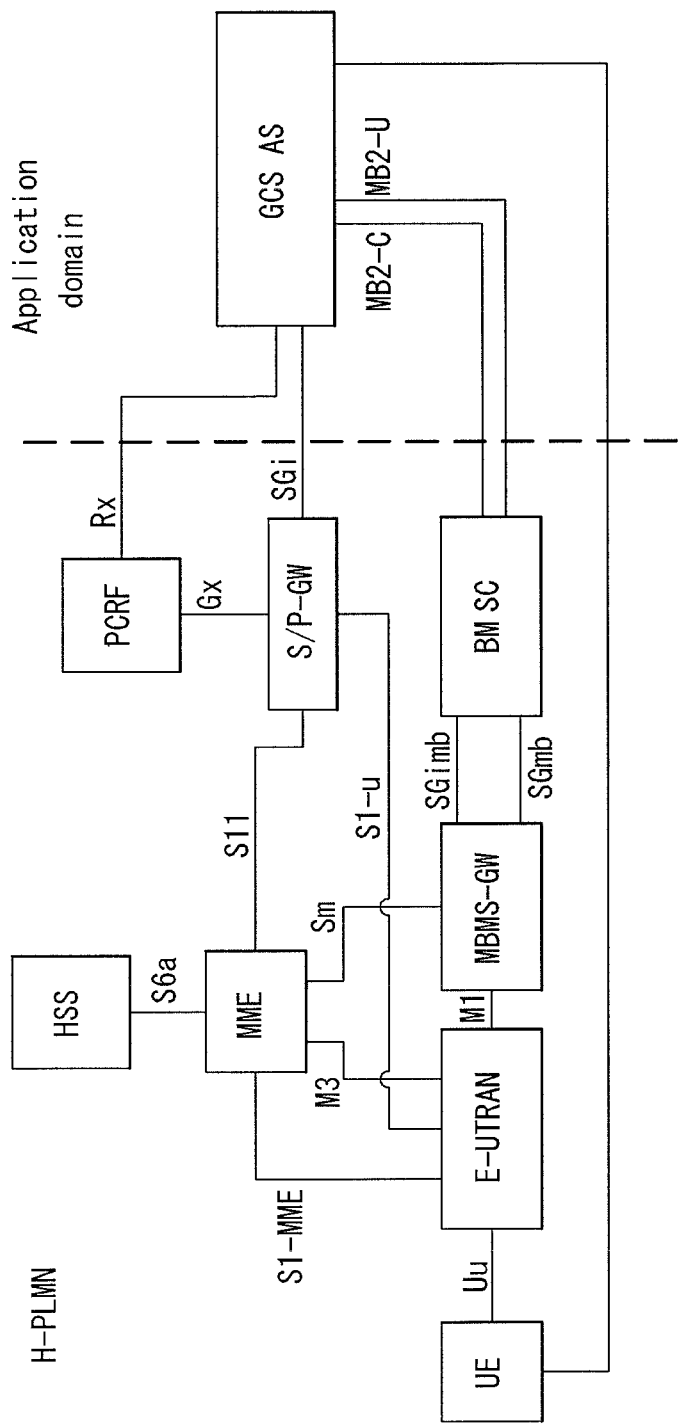

[FIG. 13]
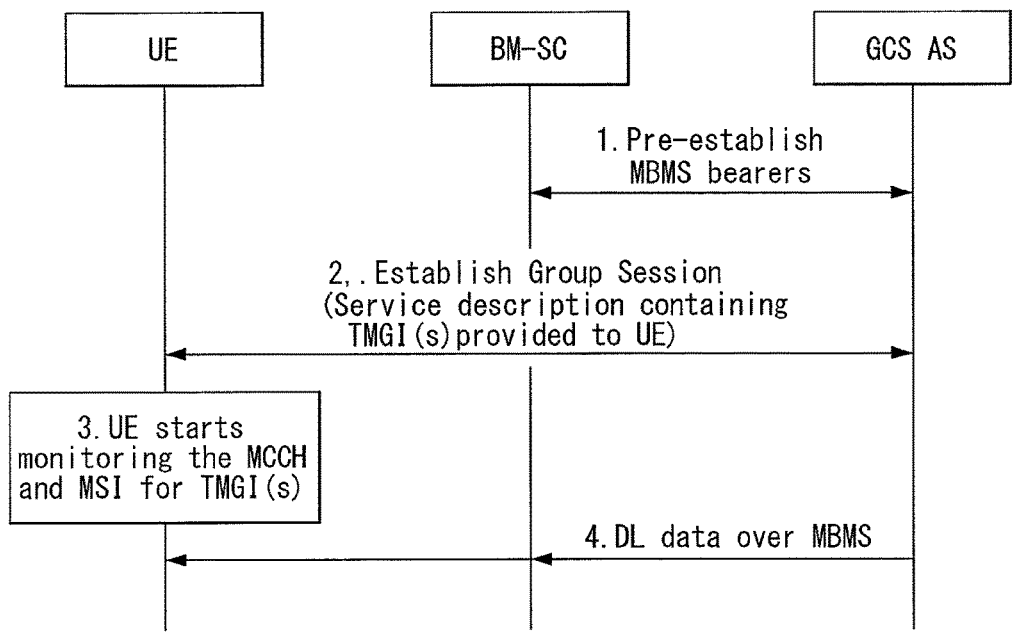

[FIG. 14]
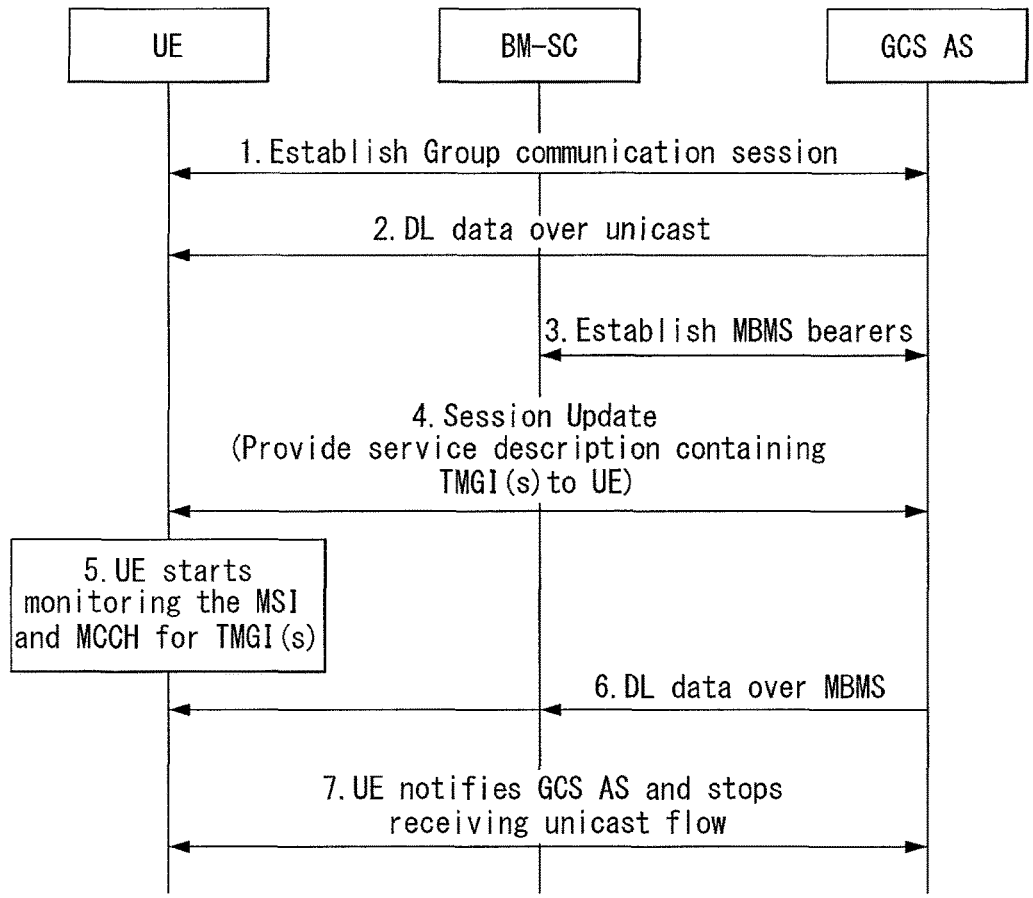
[FIG. 15]
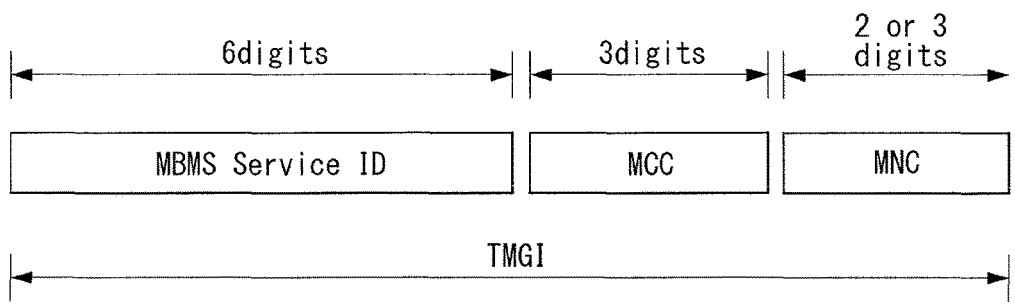

【FIG. 16】
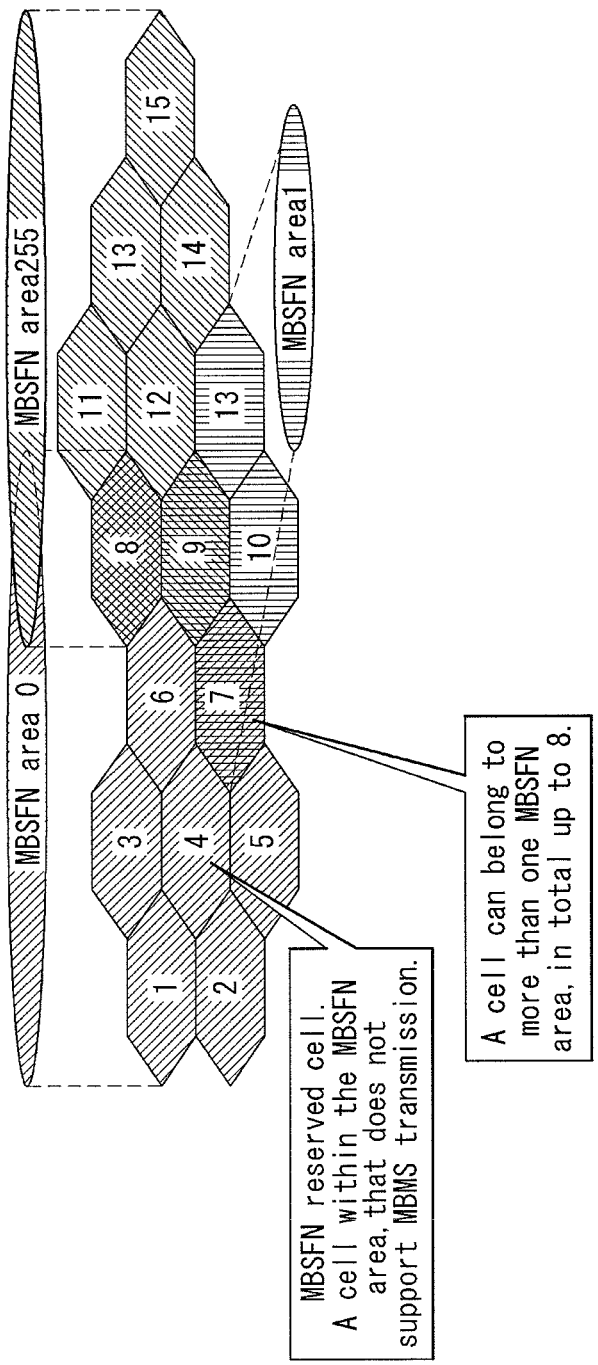

[FIG. 17]
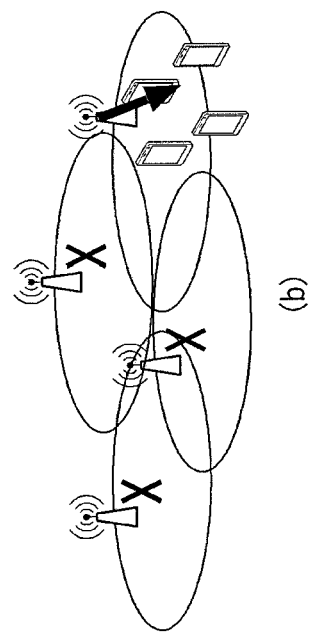
(b)
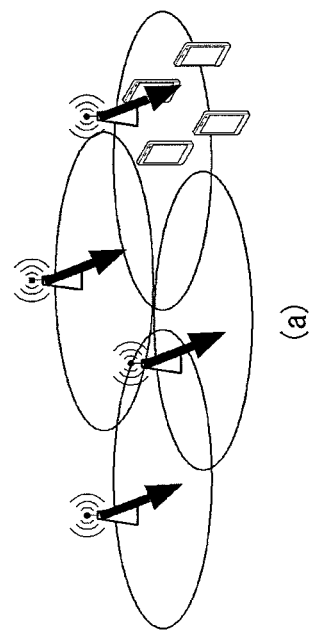
(a)

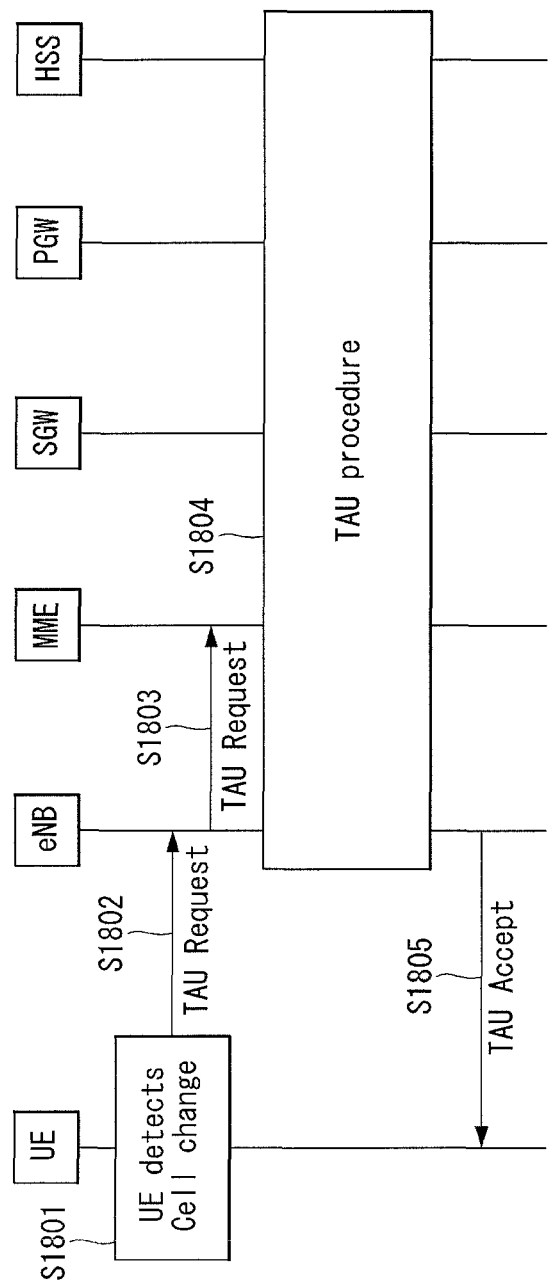
[FIG. 18]

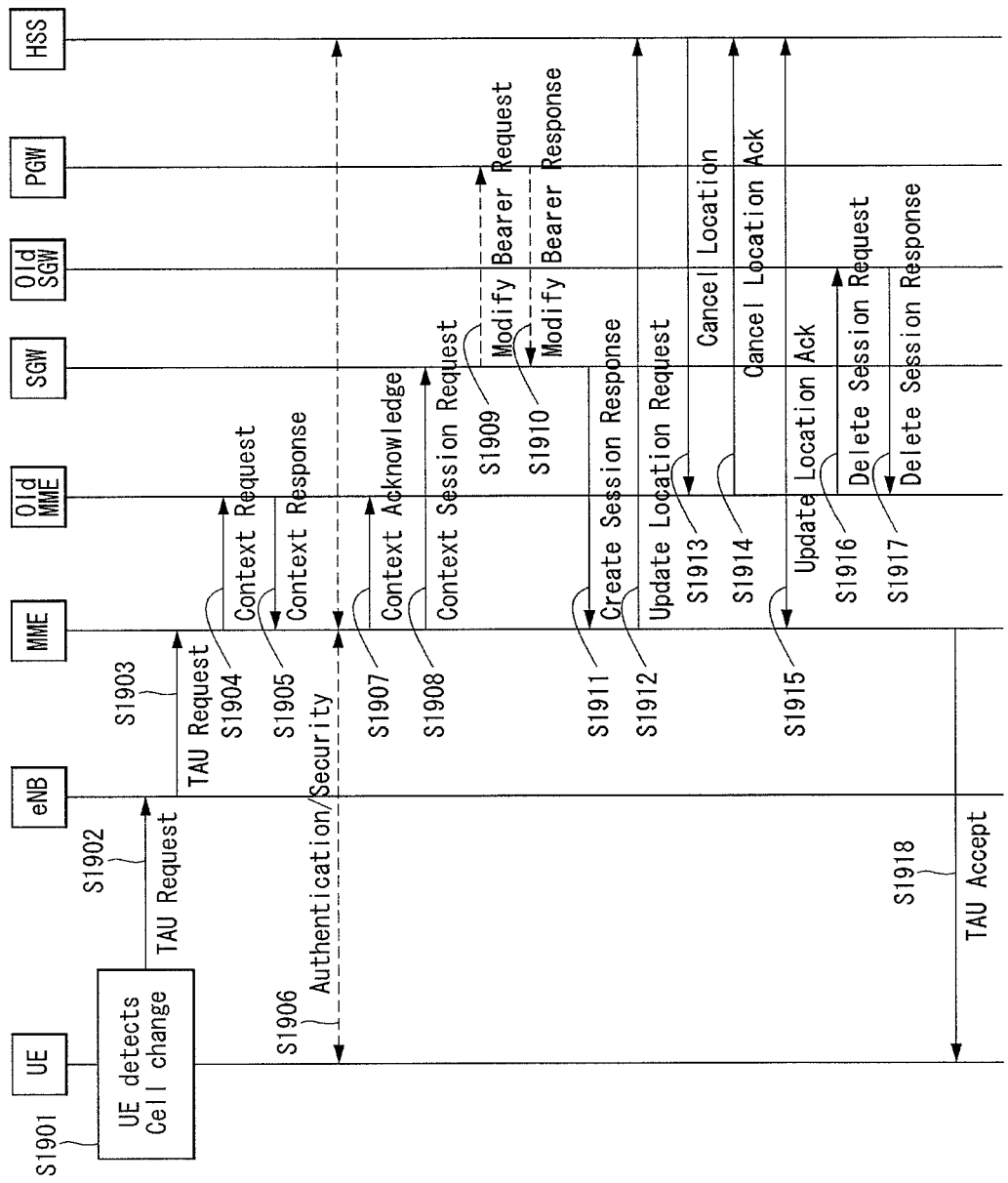
[FIG. 19]

[FIG. 20]
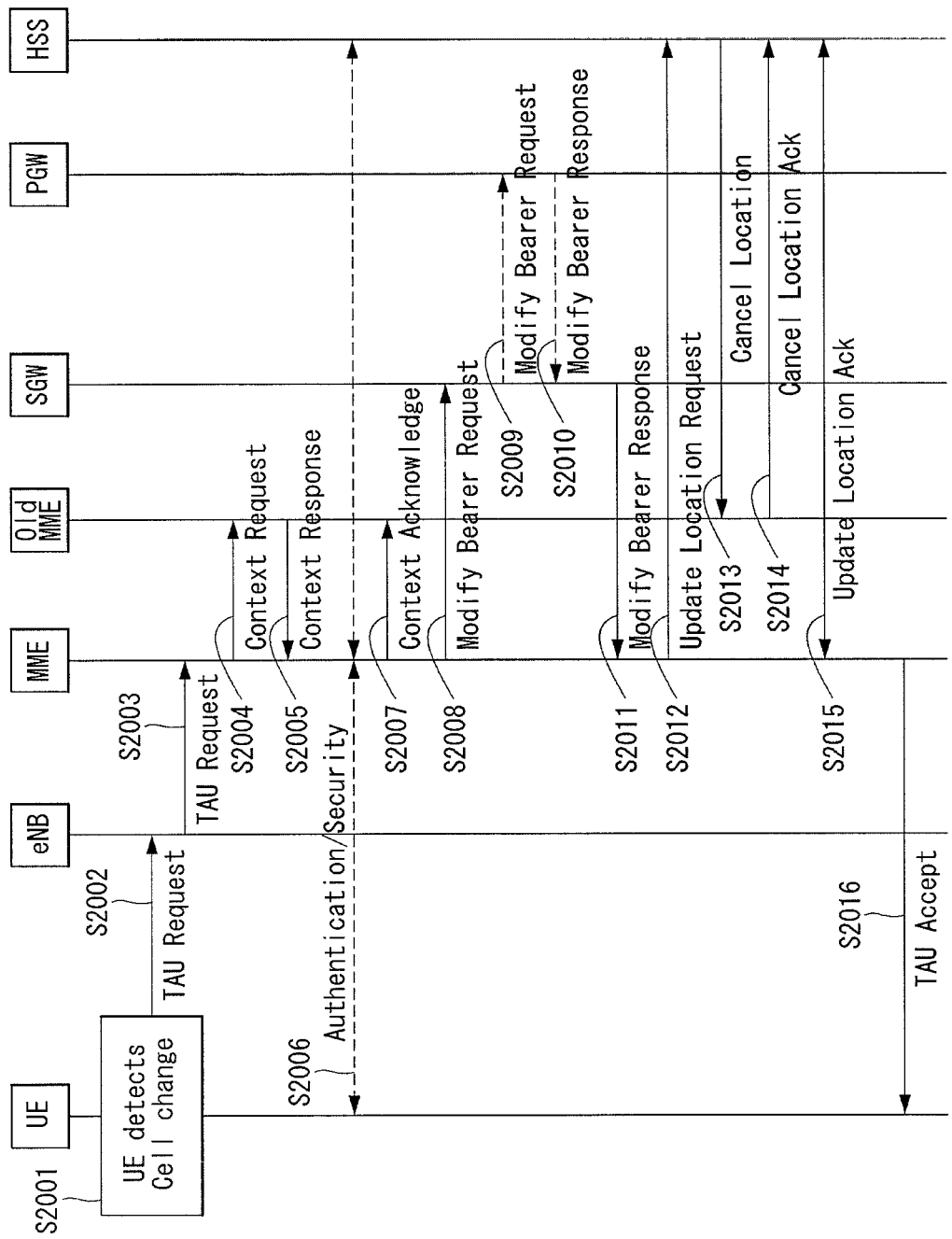

[FIG. 21]
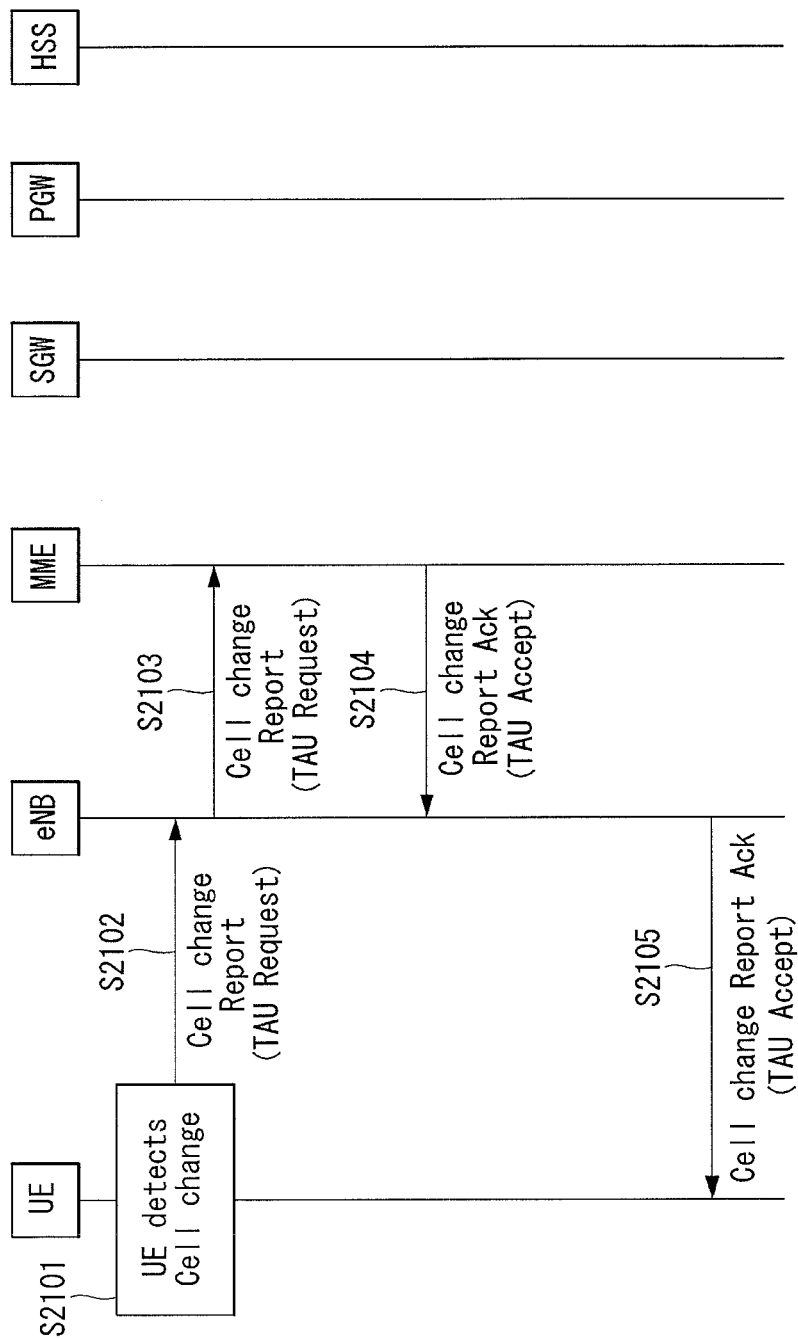

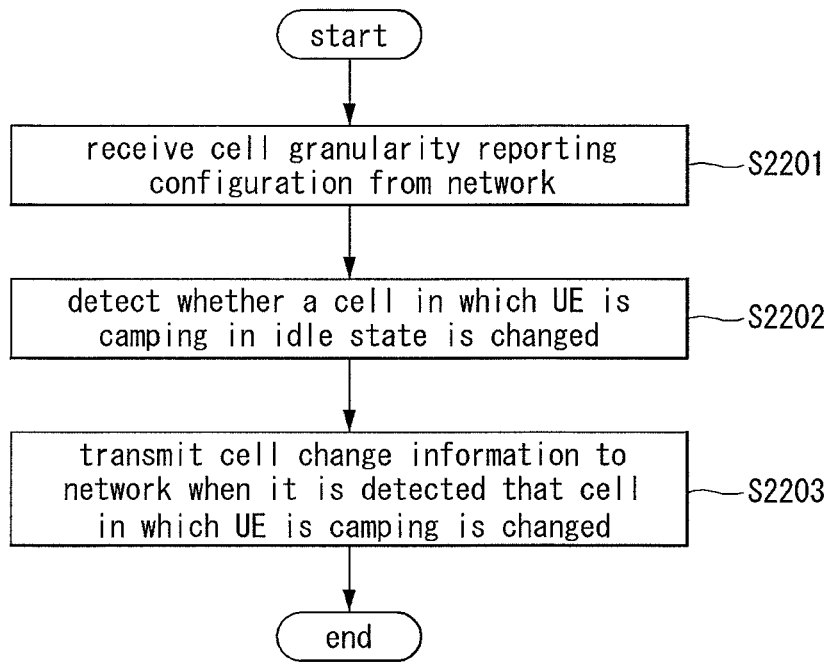
[FIG. 22]

[FIG. 23]
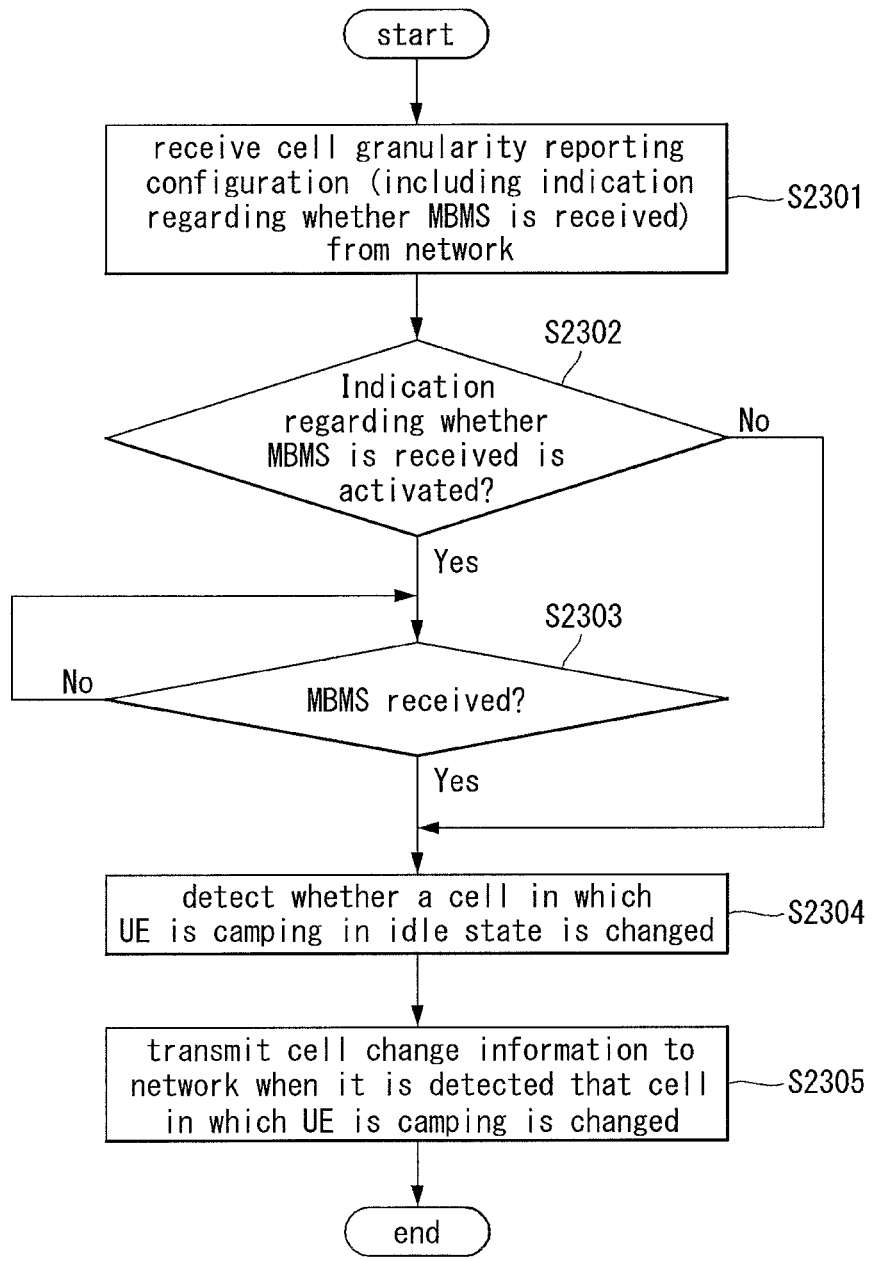

[FIG. 24]
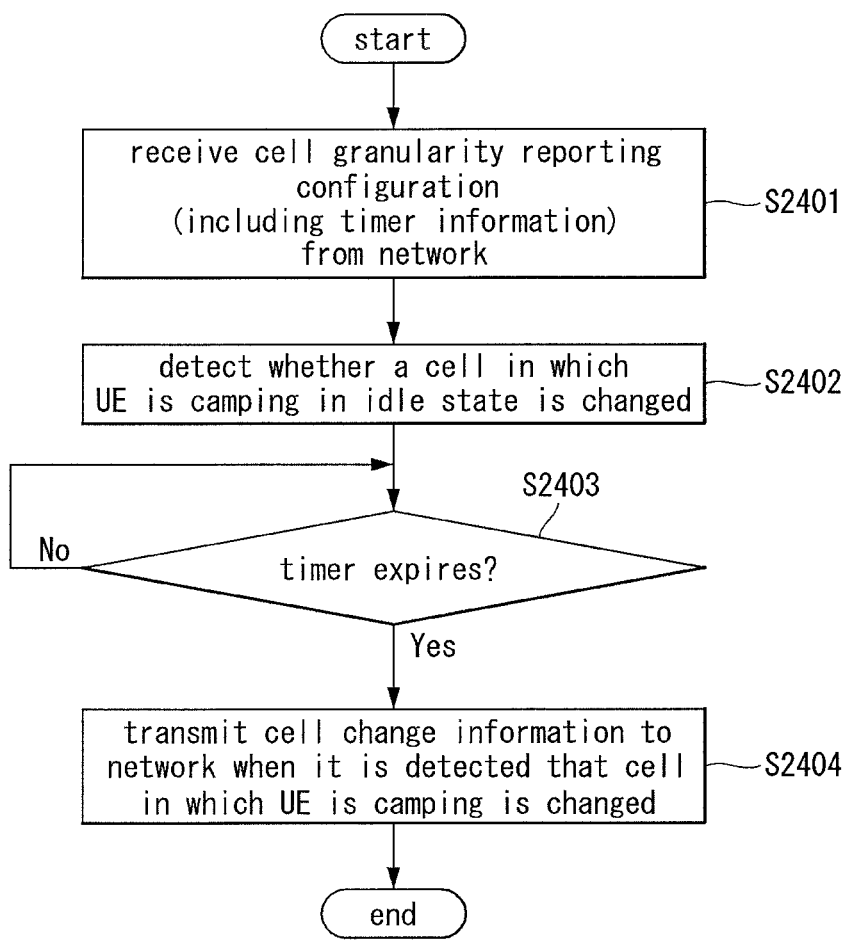

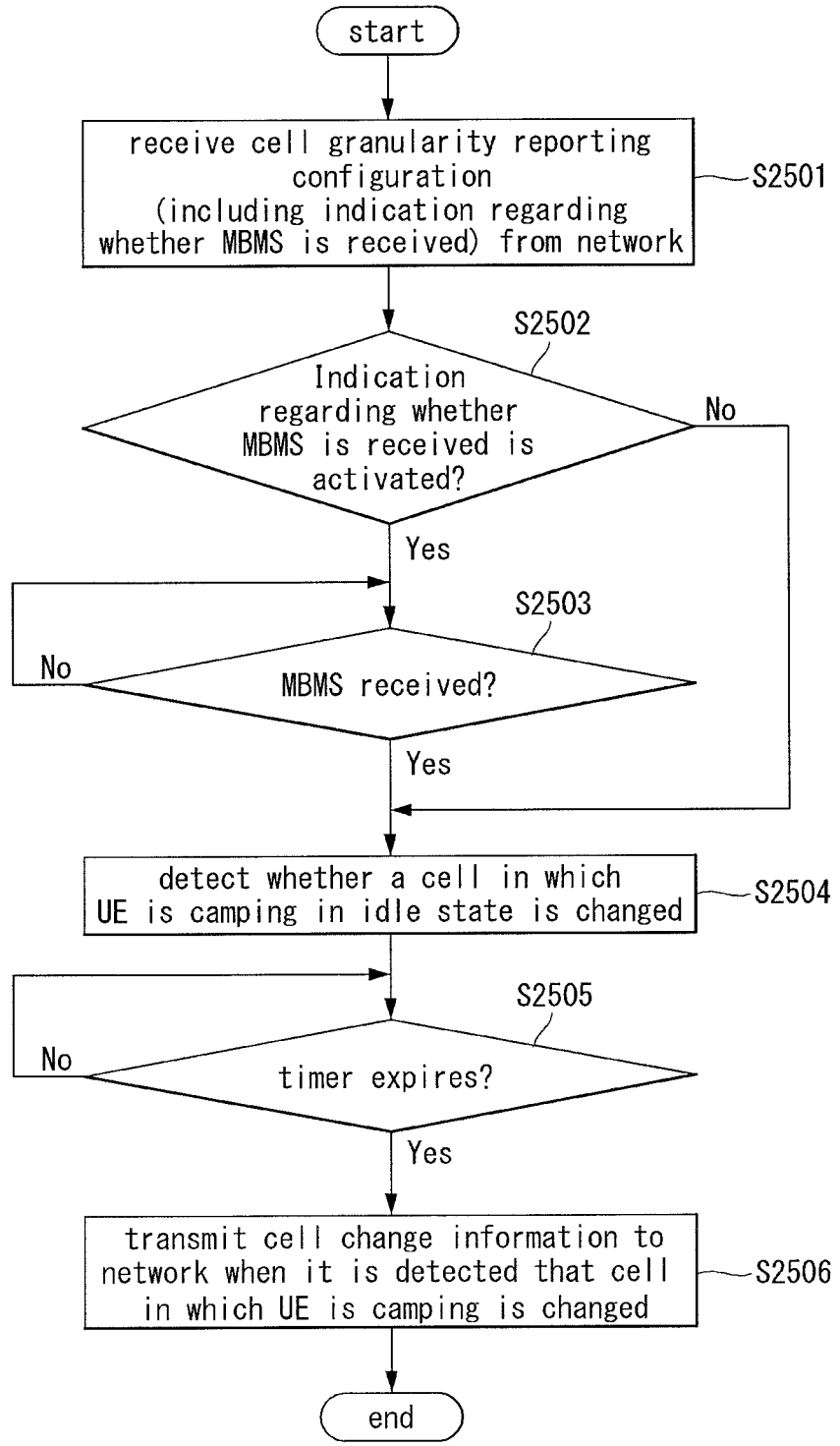
[FIG. 25]

[FIG. 26]
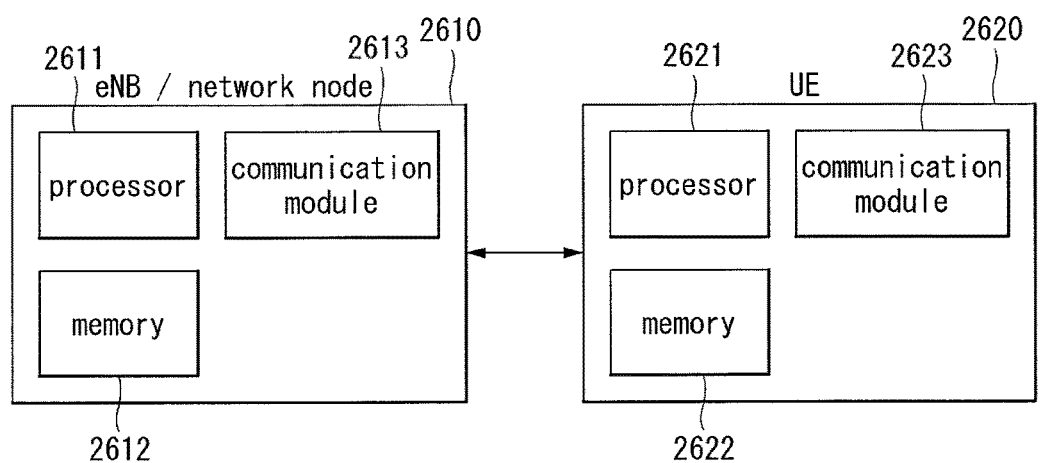

METHOD AND DEVICE FOR CELL GRANULARITY REPORTING IN WIRELESS COMMUNICATION SYSTEM

CROSS REFERENCE TO RELATED APPLICATIONS

This application is the National Phase of PCT/KR2015/010517 filed on Oct. 5, 2015, which claims priority under 35 U.S.C. § 119(e) to U.S. Provisional Application No. 62/059,165 filed on Oct. 3, 2014, all of which are hereby expressly incorporated by reference into the present application.

TECHNICAL FIELD

The present invention relates to a wireless communication system and, more particularly, to a method for cell granularity reporting to allow a network to recognize a location of a user equipment in an idle state by cell granularity, and a device supporting the same.

BACKGROUND ART

Machine Type Communication (MTC) refers to a communication scheme including one or more machines and is also called Machine-to-Machine (M2M) communication. A machine in this context refers to an entity which does not require direction intervention of a human. For example, not only the device such as a meter equipped with a mobile communication module or a vending machine, but also a user equipment such as a smart phone capable of connecting automatically to a network and performing communication without a human intervention is an example of the machine. Various examples of the machine are called MTC devices or terminals in this document. In other words, MTC refers to the communication performed by one or more machines (namely, MTC devices) without incorporating human operation/intervention.

MTC includes communication between MTC devices (for example, Device-to-Device (D2D) communication) and communication between an MTC device and an MTC Application Server. Examples of communication between an MTC device and an MTC application include communication between a vending machine and a server; communication between a Point Of Sale (POS) device and a server; and communication between an electricity, gas, or water meter and a server. Besides, applications based on MTC include security, transportation, and health care.

DISCLOSURE

Technical Problem

An aspect of the present invention provides a method for performing cell granularity reporting by a user equipment (UE) such that a network recognizes a location of a UE in an idle state by cell granularity.

Technical objects of the present invention are not limited to those objects described above; other technical objects not mentioned above can be clearly understood from what are described below by those skilled in the art to which the present invention belongs.

Technical Solution

According to an aspect of the present invention, a method for performing cell granularity reporting by a user equipment (UE) in an idle state in a wireless communication system includes: receiving a cell granularity reporting configuration from a network; detecting whether a cell in which the UE is camping in the idle state is changed; and when it is detected that the cell in which the UE is camping is changed, transmitting cell change information to the network, wherein the cell granularity reporting configuration includes an indication regarding whether to receive a multimedia broadcast and multicast service (MBMS), and when the indication regarding whether an MBMS is received is activated, the UE does not perform the cell granularity reporting unless the UE receives MBMS data.

According to another aspect of the present invention, a user equipment (UE) for performing cell granularity reporting in an idle state in a wireless communication system, includes: a radio frequency (RF) unit transmitting and receiving a wireless signal; and a processor controlling the RF unit, wherein the processor is configured to receive a cell granularity reporting configuration from a network, detect whether a cell in which the UE is camping in the idle state is changed, and transmit cell change information to the network when it is detected that the cell in which the UE is camping is changed, wherein the cell granularity reporting configuration includes an indication regarding whether to receive a multimedia broadcast and multicast service (MBMS), and when the indication regarding whether an MBMS is received is activated, the UE does not perform the cell granularity reporting unless the UE receives MBMS data.

Preferably, in cases where the indication regarding whether an MBMS is received is activated, when the UE receives MBMS data, the UE may transmit cell change information to the network.

Preferably, whether MBMS data is received may be determined by whether MBMS data corresponding to a temporary mobile group identity (TMGI) designated in the UE is received.

Preferably, whether MBMS data is received may be determined by whether MBMS data is detected by the UE.

Preferably, when the indication regarding whether an MBMS is received is not activated, the cell change information may be transmitted to the network, regardless of whether MBMS data is received.

Preferably, the cell granularity reporting configuration may include timer information, and when the timer expires, the cell change information may be transmitted to the network.

Preferably, the cell granularity reporting configuration may include timer information, and when the timer does not expire, the cell change information may not be transmitted to the network although it is detected that the cell in which the UE is camping is changed.

Preferably, the timer may be driven at a timing at which the timer information is received, a timing at which the UE transitions from a connected state to an idle state, a timing at which MBMS data is received, or at a timing at which it is detected that the cell in which the UE is camping is changed.

Preferably, the cell change information may be transmitted through a tracking area update (TAU) request message or a cell change report message.

Preferably, the cell granularity reporting configuration may be received during an attach procedure or during a TAU procedure.

Preferably, the cell change information may include information indicating that the cell in which the UE is camping is changed and/or a cell identity of the cell in which the UE is camping.

The advantageous effect that can be obtained from the present invention are not limited to those described above, and other effects not mentioned above can be understood clearly by those skilled in the art to which the present invention belongs from the following descriptions.

Advantageous Effects

According to an embodiment of the present invention, a network may recognize a location of a user equipment in an idle mode by cell granularity.

Also, according to embodiment of the present invention, efficiency of MBMS communication and device monitoring used for group communication and MTC group messaging may be enhanced.

Also, according to embodiment of the present invention, when a network provides a multimedia broadcast and multicast service (MBMS) or group communication/messaging service, the network may determine whether to provide the service by an MBMS bearer or a unicast bearer by cell granularity.

Also, according to embodiment of the present invention, a specific application such as an MTC application, or the like, may accurately recognize the number of user equipments that belong to a specific cell.

Also, according to embodiment of the present invention, when a paging message is transmitted to a terminal in an idle mode, the paging message may be transmitted only in a cell to which the corresponding terminal belongs.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 is a view illustrating a structure of an E-UTRAN and EPC in a wireless communication system to which the present is applicable.

FIG. 4 is a view illustrating a structure of a radio interface protocol between a terminal and an E-UTRAN in a wireless communication system to which the present is applicable.

FIG. 5 is a view illustrating an S1 interface protocol structure in a wireless communication system to which the present invention is applicable.

FIG. 6 is a view schematically illustrating a structure of a physical channel in a wireless communication system to which the present invention is applicable.

FIG. 7 is a view illustrating a state of an EMM and an ECM in a wireless communication system to which the present invention is applicable.

FIG. 8 is a view illustrating a bearer structure in a wireless communication system to which the present invention is applicable.

FIG. 9 is a view illustrating a transmission path of a control plane and a user plane in an EMM registered state in a wireless communication system to which the present invention is applicable.

FIG. 10 is a view illustrating definition of an MBMS in a wireless communication system to which the present invention is applicable.

FIG. 11 is a view illustrating a logical structure of an MBMS in a wireless communication system to which the present invention is applicable.

FIG. 12 is a view illustrating a GCSE reference model to which the present invention is applicable.

FIG. 13 is a view illustrating a process of setting up a downlink media path for MBMS transmission in a wireless communication system to which the present invention is applicable.

FIG. 14 is a view illustrating a process of setting up a downlink media path for MBMS transmission in a wireless communication system to which the present invention is applicable.

FIG. 15 is a view illustrating a structure of a TMGI in a wireless communication system to which the present invention is applicable.

FIG. 16 is a view illustrating an MBSFN area in a wireless communication system to which the present invention is applicable.

FIG. 17 is a view illustrating cell granularity MBMS transmission in a wireless communication system to which the present invention is applicable.

FIGS. 18 to 25 are views illustrating a cell granularity reporting method according to an embodiment of the present invention.

FIG. 26 is a block diagram of a communication device according to an embodiment of the present invention.

BEST MODES

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW), Packet Data Network Gateway (PDN GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference point | Description |
|---|---|
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

An E-UTRAN system, a system evolved from an existing UTRAN system, may be, for example, a 3GPP LTE/LTE-A system. A communication network is extensively deployed to provide various communication services such as voice (e.g., a voice over Internet protocol (VoIP) through an IMS and packet data.

Referring to FIG. 2, an E-UMTS network includes an E-UTRAN, an EPC, and one or more UEs. The E-UTRAN includes eNBs providing control plane and user plane protocols to a UE, and the eNBs are connected through an X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

The MME may perform various functions such as NAS signaling security, access stratum (AS) security control, inter-core network (CN) signaling for supporting mobility between 3GPP access networks, idle mode UE reachability (including performing and controlling paging retransmission, management of a tracking area identity (TAI) (for idle and active mode terminals), PDN GW and SGW selection, MME selection for handover in which MME is changed, SGSN selection for handover to 2G or 3G 3GPP access network, a bearer management function including roaming, authentication, dedicated bearer establishment, support for message transmission of a public warning system (PWS) (including earthquake and tsunami warning system (ETWS) a commercial mobile alert system (CMAS).

FIG. 3 is a view illustrating a structure of an E-UTRAN and an EPC in a wireless communication system to which the present invention is applicable.

Referring to FIG. 3, an eNB may select a gateway (e.g., an MME), perform routing to a gateway during activation of a radio resource control (RRC), scheduling and transmission of a broadcast channel (BCH), dynamic resource allocation from uplink and downlink to a UE, and a function of mobility control connection in an LTE_ACTIVE state. As described above, within an EPC, a gateway may perform paging origination, LTE_IDLE state management, ciphering of a user plane, system architecture evolution (SAE) bearer control, and ciphering of NAS signaling and integrity protection.

FIG. 4 is a view illustrating a structure of a radio interface protocol between a UE and an E-UTRAN in a wireless communication system to which the present invention is applicable.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel is higher than a transport channel and is mapped to a transport channel. The logical channel may be classified as a control channel for transmission of control region information and a traffic channel for transmission of a user region information. The control channel includes a broadcast control channel (BCCH), a paging control channel (PCCH), a common control channel (CCCH), a dedicated control channel (DCCH), a multicast control channel (MCCH), and the like. The traffic channel includes a dedicated traffic channel (DTCH), a multicast traffic channel (MTCH), and the like. The PCCH is a downlink channel transmitting paging information and is used when a network does not know a cell to which a UE belongs. The CCCH is used by a UE which is not RRC-connected to a network. The MCCH is a point-to-multipoint downlink channel used for transmitting multimedia broadcast and multicast service (MBMS) control information from a network to a UE. The DCCH is a point-to-point bi-directional channel used by a UE which is RRC-connected to a network and transmits dedicated control information to the network. The DTCH is a point-to-point channel dedicated to one UE to transmit user information that may be present in uplink and downlink. The MTCH is a point-to-multipoint downlink channel for transmitting traffic data from a network to a UE.

In the case of uplink connection between the logical channel and the transport channel, the DCCH may be mapped to a UL-SCH, the DTCH may be mapped to a UL-SCH, and the CCCH may be mapped to a UL-SCH. In the case of downlink connection between the logical channel and the transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to an MCH.

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

With reference to FIG. 4, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP)

layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

FIG. 6 is a view schematically illustrating a structure of a physical channel in a wireless communication system to which the present invention is applicable.

Referring to FIG. 6, a physical channel may perform signaling and transmit data through a radio resource including one or more subcarriers in a frequency domain and one or more symbols in a time domain.

A subframe having a length of 1.0 ms includes a plurality of symbols. A specific symbol (or symbols) of the subframe (e.g., a first symbol of the subframe) may be used for a PDCCH. The PDCCH carries information regarding a dynamically allocated resource (e.g., a resource block, a modulation and coding scheme (MCS), etc.).

EMM and ECM State

In what follows, EPS Mobility Management (EMM) and EPS Connection Management (ECM) states will be described.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Similarly, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the position of the UE differs from the position recognized by the network while the UE is in the ECM-IDLE state, the UE can inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

EPS Bearer

FIG. 8 illustrates a bearer structure in a wireless communication system to which the present invention can be applied.

When the UE is connected to a Packet Data Network (PDN) (which is the peer entity of FIG. 6), PDN connection is established, which can be called an EPS session. The PDN provides a service function such as the Internet or IP Multimedia Subsystem (IMS) through an external or internal IP network of the service provider.

An EPS session comprises one or more EPS bearers. The EPS bearer refers to the transmission path of traffic generated between the UE and the PDN GW for the EPS to deliver user traffic. One or more EPS bearers can be set up for each UE.

Each EPS bearer can be classified into E-UTRAN Radio Access Bearer (E-RAB) or S5/S8 bearer, and the E-RAB can be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs can be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs can be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer can be one of two types: a default bearer and a dedicated bearer. The UE can have one default bearer and one or more dedicated bearers for each PDN. The minimum basic bearer that the EPS session can have with respect to one PDN is called default bearer.

The EPS bearer can be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And if new traffic is generated in the corresponding PDN, the E-RAB bearer is reconfigured to deliver traffic.

If the UE attempts to use a service of which the Quality of Service (QoS) (for example, Video on Demand (VoD) service) cannot be supported by the default bearer while using a service (for example, the Internet) through the default bearer, a dedicated bearer is created when the UE demands the high QoS service. In case there is no traffic from the UE, the dedicated bearer is released. The UE or the network can create a plurality of dedicated bearers depending on needs.

Depending on which service the UE uses, the IP flow can have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (for example, a QoS policy, gate status, and charging method).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or refused when only limited amount of resources are available. Also, the ARP can be used for the eNB to determine which bearer(s) to drop under the situation of limited resources (for example, handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

FIG. 9 illustrates transmission paths of a control plane and a user plane in an EMM registration state in a wireless communication system to which the present invention can be applied.

FIG. 9(a) illustrates ECM-CONNECTED state, and FIG. 9(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 9(a), in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, all of the DRB, S1 bearer, and S5 bearer are set up (namely, radio or network resources are allocated).

As shown in FIG. 9(b), in the ECM-IDLE state where there is no user traffic, the ECM connection (namely, RRC connection and S1 signaling connection) is released. However, the S11 GTP-C connection between the MME and the SGW; and the S5 GTP-C connection between the SGW and the PDN GW are retained.

Also, in the ECM-IDLE state, the DRB and the S1 bearer are all released, but the S5 bearer is retained (namely, radio or network resources are allocated).

MBMS (Multimedia Broadcast/Multicast Service)

Terms that may be used in an MBMS are defined as follows.

MBSFN (Multicast broadcast single frequency network) synchronization region: It is a network region in which every eNB is synchronized and performs MBSFN transmission. The MBSFN synchronization region may support one or more MBSFN areas. In a given frequency layer, an eNB may belong to one MBSFN synchronization region. The MBSFN synchronization region is irrelevant to definition of an MBMS service region.

MBSFN transmission or transmission in MBSFN mode: A simulcast transmission technique realized by simultaneously transmitting the same waveforms from multiple cells. MBSFN transmission from multiple cells within an MBSFN area are seen as single transmission to a UE.

MBSFN area: An MBSFN area includes a group of cells within an MBSFN synchronization region of a network and the cells of the group cooperatively perform MBSFN transmission. Every cell of the MBSFN area, excluding an MBSFN area reserved cell(s), contributes to MBSFN transmission and advertises validity thereof. In cases where a UE knows which MBSFN area supports a service desired by the UE, only a sub-set of a set MBSFN area may need to be considered.

MBSFN area reserved cell: A cell within an MBSFM area, which does not contribute to MBSFN transmission. Transmission for other services may be allowed for this cell, but power is limited in a resource allocated for MBSFN transmission.

Synchronization sequence: Each synchronization protocol data unit (SYNC PDU) includes a time stamp indicating a starting time of a synchronization sequence. In an MBMS service, each synchronization sequence has the same duration set within a broadcast/multicast service center (BM-SC) and an MCE.

Synchronization period: A synchronization period provides a time reference for indicating a starting time of each synchronization sequence. A time stamp provided within each SYNC PDU is a relative value referring to a starting time of the synchronization period. A duration of the synchronization period may be set.

FIG. 10 is a view illustrating a definition of an MBMS in a wireless communication system to which the present invention is applicable.

Referring to FIG. 10, the MBMS service area (MBMS SA) includes one or more MBSFN areas. The MBMS SA includes one or more MBMS SI identities (MEMS SAIs).

The MBMS SAI identifies a group of cells within one PLMN and is independent from an associated position/routing/physical position of service area and cell(s). One cell may belong to one or more MBMS SA(s), and thus, it may be identified by one or more MBMS SAI(s).

A plurality of cells including a plurality of MBSFN area reserved cells may be present within each MBSFN area.

In an E-UTRAN, an MBMS is supported only within a carrier shared with unicast traffic. Cell(s) performing MBMSS transmission are MBMS/unicast mixed cells.

In the MBMS/unicast mixed cell, an MTCH and an MCCH are mapped to an MCH for point-to-multipoint transmission, and intra-cell unicast MBMS transmission are performed in a coordinated manner.

A UE in an RRC-CONNECTED or RRC-IDLE state may receive an MBMS. Whenever the MBMS service is received, the user may be notified an incoming call and originate a call.

FIG. 11 is a view illustrating an MBMS logical structure in a wireless communication system to which the present invention is applicable.

A multi-cell/multicast coordinating entity (MCE) is a logical entity and is configured as part of a different network element. Functions of the MCS are as follows.

Admission control and allocation of radio resource used by every eNB within an MBSFN area for multi-cell MBMS transmission using MBSFN operation. When radio resource is not sufficient for corresponding MBMS service(s) according to allocation and retention priority (ARP) or when radio resource is preempted from other radio bearer(s) of ongoing MBMS service(s), the MCE determines not to establish radio bearer(s) of new MBMS service(s). Also, the MCE determines setting of a wireless resource (e.g., a modulation and coding scheme (MCS) in conjunction with allocation of time/frequency radio resource.

Counting for MBMS service(s) and obtaining counting result

For example, resumption of MBMS session(s) within MBSFN region(s) based on counting resources for ARP and/or corresponding MBMS service(s)

For example, suspension of MBMS session(s) within MBSFN region(s) based on counting resources for ARP and/or corresponding MBMS service(s)

In the case of distributed MCE architecture, the MCE manages the aforementioned function for a single eNB of an MBSFN.

The MCE participates in MBMS session control signaling.

An MBMS gateway (GW), a logical entity, may be present between a broadcast/multicast service center (BMSC) and eNB(s). A major function of the MBMS GW is transmitting/broadcasting an MBMS packet to each eNB transmitting a service. The MBMS GW uses an IP multicast as a means for transmitting MBMS user data to an eNB. The MBMS GW performs MBMS session control signaling (i.e., session starting/updating/terminating) to an E-UTRAN through an MME.

A broadcast/multicast service center (BM-SC) schedules an MBMS service, reports an MBMS service to a UE, and allocates a bearer service identifier. Also, the BM-SC may start or terminate a MBMS bearer resource (i.e., an MBMSS session). A BM-SC entity may serve as an interface point for a content provider. The BM-SC may serve as a termination point of an SYNC protocol through an M1 interface.

The SYNC protocol refers to a protocol for transmitting additional information to allow an eNB to identify a timing for radio frame transmission and detect packet loss. Each enhanced MBMS (eMBMS) service uses an SYNC entity of resource. The SYNC protocol may be applied to downlink and terminates in the BM-SC.

An eNB supporting the eMBMS supports the BM-SC and the SYNC protocol. The eNB joins an IP multicast group for user plane data transmission, terminates an MCCH, and instructs a UE to start and terminate an MBMS session.

The MME provides a signaling path between the BM-SC and the eNB. That is, the BM-SC performs signaling to the eNB through the MME.

An application part is defined as an M3 interface between the MME and the MCE. The application part allows MBMS session control signal at an E-RAB level. That is, the application part does not transmit radio configuration data. This procedure includes, for example, MBMS session starting and termination, or the like. An SCTP is used for signaling transmission and point-to-point signaling is applied.

The application part is defined for an M2 interface between the MCE and the eNB and transmits radio configuration data for at least multi-cell transmission mode eNB and session control signaling. An SCTP is used for signaling transmission and point-to-point signaling is applied.

The M1 interface is a user plane interface between the MBMS GW and the eNB. As a result, a control plane application part is not defined for this interface. IP multicast is used for point-to-multipoint transmission of a user packet.

Sm is a control plane interface between the MME and the MBMS GW.

SGmb/SGimb is a control/user plane interface between the BM-SE and the MBMS GW.

Hereinafter, a radio channel for an MBSFN will be described.

In general, control information related to UE(s) supporting the MBMS is distinguished from unicast control information as possible. Most MBMS control information is provided in a specific logical channel (i.e., an MCCH) for MBMS common control information.

An E-UTRA uses one MCCH logical channel per MBSFN region.

In cases where a network sets multiple MBSFN areas, a UE obtains MBMS control information from a set MCCH to identify whether a service desired to be received is in progress. The MCCH transfers an MBSFN area configuration message (MBSFNAreaConfiguration) indicating corresponding radio resource configuration, as well as the ongoing MBMS session.

Also, when the E-UTRAN wants to count the number of UEs in an RRC_CONNECTED state which are receiving or want to receive one or ore specific MBMS services, the MCCH transfers an MBMS counting request message (MBMSCountingRequest).

Part of MBMS control information is provided on a BCCH. This is mainly related to information required for obtaining MCCH(s). This information is transferred through a single MBMS-specific system information block (SIB) (e.g., an SIB 13).

The MBSFN area is identified by an MBSFN area identifier (mbsfn-AreaId) within the SIB 13.

When a UE is on the move and a source cell and a target cell broadcast the same value within the MBSFN area identifier (mbsfn-AreaId), the UE regards the MBSFN area as being continuous.

The MCCH information is periodically transmitted using a set repetition period. In the MCCH, scheduling information is not provided, and a lower layer configuration, as well as time domain scheduling as defined in the SIB 13, is semi-statically configured.

In MBMS user data transferred by an MTCH logical channel, the E-UTRAN periodically provides MCH scheduling information (MSI) in a lower layer (e.g., a MAC layer). The MCH information is related to time domain scheduling. That is, frequency domain scheduling and lower layer configuration are semi-statically configured.

Periodicity of the MSI may be set and is defined by an MCH scheduling period.

GCSE (Group Communication System Enablers)

In a group communication service, the following definition may be introduced.

Group member: User designated in a GCSE group

GCSE group: set of group members

Receiver group member: A group member desired to receive group communication which is currently ongoing or which is to be performed later, among group members of the GCSE group Transmitter group member: A group member authorized to transmit group communication which is currently ongoing or which is to be performed later, among group members of the GCSE group Group communication: Communication from the transmitter group m ember to the receiver group member Group communication system enabler (GSCE): An entity allowing an application layer function to provide group communication through the E-UTRAN Multipoint service: A service used for distributing the same contents to UE(s) through a resource-effective method A group communication service application server (GSC AS) may use an EPS bearer service and additionally use an MBMS bearer service to transfer application signaling and data between the GSC AS and a UE.

In an uplink direction, a UE uses an EPS bearer service when the UE wants to exchange application signaling with the GCS AS or wants to transmit the application signaling to the GCS AS. In a downlink direction, the GCS AS may transfer application signaling and data through an individual EPS bearer service of a UE and/or MBMS bearer service. In order to join one or more GCS group, a GCS UE registers to the GCS AS using application signaling.

When the MBMS bearer service is used, a broadcast service area of the MBMS bearer service may be previously configured to be used by the GCS AS. Also, when it is determined that the number of UEs for a GCS group is sufficiently large within an area (e.g., one or more cells), the GCS AS may dynamically determine to use an MBMS bearer service. That is, in cases where the number of UEs served in a specific cell(s), an EPS bearer (i.e., a unicast bearer) may be switched to an MBMS bearer.

When the MBMS bearer service is used, the GCS AS may transfer data to different GCS groups through a single MBMS broadcast bearer. Application signaling and data transferred through an MBMS bearer(s) are transparent to a broadcast multicast-service center (BM-SC) and the MBMS bearer service. The GCS AS provides every configuration information to UEs through GCS application signaling. Here, the configuration information refers to information required for a UE to receive data through an MBMS bearer service and appropriately handle the data.

When the GCS UE moves from an area in which an MBMS broadcast bearer is available to be used to an area in which the MBMS broadcast bearer is not available to be used, the UE may inform the GCS AS that MBMS broadcast bearer reception has been changed to MBMS broadcast bearer non-reception, through application signaling, and the GCS AS activates downlink application signaling and data transmission through a UE individual EPS bearer. Or, conversely, the UE may inform the GCS AS that broadcast bearer non-reception has been changed to MBMS broadcast bearer reception, and the GCS AS deactivates downlink application signaling and data transmission through a UE individual EPS bearer. In order to guarantee service continuity, the UE may temporarily receive GCS application signaling and data which are the same in parallel through EPS bearer(s) and MBMS service(s).

MBMS delivery refers to a mechanism that application data and signaling are delivered using an MBMS bearer service.

The GCS AS uses an MBMS bearer for MBMS delivery. The MBMS bearer is used to deliver data from the GCS AS to the UE in downlink. MBMS bearer(s) used for MBMS delivery may be pre-established before a group communication session is set up or may be dynamically established after the group communication session is set up.

Unicast delivery refers to a mechanism that application data and signaling are delivered using an EPS bearer service.

The UE and the GCS AS uses an EPS bearer for unicast delivery. The EPS bearer is used for exchanging GC1 signaling between the UE and the GCS AS, transmitting data from the UE to the GCS AS in uplink, and transmitting data from the GCS AS to the UE in downlink when MBMS delivery is not available or desirable. The GCS AS uses an Rx interface to specify and correct a priority level of an EPS bearer used for a group communication session.

FIG. 12 is a view illustrating a GCSE reference model to which the present invention is applicable.

Referring to FIG. 12, the GCS AS supports the following functions.

Exchange of GC1 signaling with UE (including GCS session and group management aspect)

Reception of uplink data from UE through unicast

Data transmission to every UE that belongs to a group using unicast delivery and/or MBMS delivery Transmission of application level session information through Rx interface in PCRF direction Support of service continuity procedure to allow UE to switch between unicast delivery and MBMS delivery The GCS-supportable UE supports the following functions.

Exchange of GC1 signaling with GCS AS (including GCS session and group management aspect)

Provision of UE-specific idle mode DRX cycle length to core network

Reception of data from GCS AS using unicast delivery, MBMS delivery, or using both Transmission of uplink data to GCS using unicast Support of service continuity procedure for switching between unicast delivery and MBMS delivery Simultaneous monitoring and reception of one or more MBMS bearer(s)

The BM-SC supports the following functions.

MBMS broadcast procedure

MB2 procedure for activating, deactivating, and modifying MBMS bearer

Hereinafter, a procedure for establishing MBMS delivery in downlink will be described.

FIG. 13 is a view illustrating a process of setting up a downlink media path for MBMS delivery in a wireless communication system to which the present invention is applicable.

The GCS AS may pre-establish MBMS bearer(s) within a specific pre-configured area before starting a group communication session. When the UE requests group communication within the forgoing area, the pre-established MBMS bearer(s) are used for downlink traffic.

1. GCS AS pre-establishes MBMS bearer(s) for a group communication session. The BM-SC delivers an MBMS service description associated with MBMS bearer(s) to the GCS AS.

2. The UE establishes a group communication session with the GCS AS. The GCS AS delivers a service description associated with the MBMS bearer(s) to the UE through a GC1 interface. The UE obtains temporary mobile group identity (identifies) (TMGI(s)) for identifying MBMS bearer(s) from the service description.

3. The UE starts monitoring of MCCH and MCH scheduling information (MSI) of received MBSFN broadcast(s) regarding TMGI(s) in a camping cell. That is, the UE monitors an MCH (i.e., an MCCH) in the camping cell. MCH configuration information may be obtained through system information.

4. The UE, which has detected a TMGI from the MCCH, monitors an MSI and receives downlink data in an MTCH corresponding to the TMGI.

In detail, when the UE decodes the MCH (i.e., the MCCH), it may read an eMBMS channel information element (IE). Also, when MBMS session information of the eMBMS channel IE includes a TMGI corresponding (designated) to the UE, the UE decodes an MTCH corresponding to the TMGI. That is, the UE reads the MBMS session information and the MBMS session information does not have TMGI information thereof, the UE may not be required to read an MTCH and determine that there is no broadcast group call at a current time in the cell to which the UE belongs.

FIG. 14 is a view illustrating a process of setting up a downlink media path for MBMS delivery in a wireless communication system to which the present invention is applicable.

When starting a group communication session, the GCS AS uses a unicast bearer for communication with the UE in downlink. When the GCS AS determines to use an MBMS bearer for downlink data, the GCS AS establishes MBMS bearer(s). The GCS AS provides a service description associated with the MBMS bearer(s) obtained from the BM-SC to the UE. The UE starts to receive downlink data using the MBMS bearer(s), and stops using the unicast bearer for downlink data. The GCS AS may variously implement methods for determining establishment of a new MBMS delivery bearer. For example, the GCS AS may determine establishment an MBMS delivery bearer on the basis of a location of a UE joining a group communication session.

1. The UE establishes a group communication session with the GCS AS.
2. Downlink data is delivered by unicast deliver.
3. The GCS AS establishes MBMS bearer(s) for group communication session. The BM-SC delivers an MBMS service description associated with the MBMS bearer(s) to the GCS AS.
4. The GCS AS delivers a service description associated with the MBMS bearer(s) to the UE through a GC1 interface. The UE obtains a TMGI for identifying MBMS bearer(s) from the service description.
5. The UE starts to monitor MCCH and MCH scheduling information (MSI) of received MBSFN broadcast(s) regarding TMGI(s) in a camping cell. That is, the UE monitors an MCH (i.e., an MCCH) in the camping cell. The MCH configuration information may be obtained through system information.
6. Detecting a TMGI from the MCCH, the UE monitors an MSI and receives downlink data on an MTCH corresponding to the TMGI.

In detail, when the UE decodes the MCH (i.e., the MCCH), it may read an eMBMS channel information element (IE). Also, when MBMS session information of the eMBMS channel IE includes a TMGI corresponding (designated) to the UE, the UE decodes an MTCH corresponding to the TMGI. That is, the UE reads the MBMS session information and the MBMS session information does not have TMGI information thereof, the UE may not be required to read an MTCH and determine that there is no broadcast group call at a current time in the cell to which the UE belongs.

FIG. 15 is a view illustrating a structure of a TMGI in a wireless communication system to which the present invention is applicable.

Referring to FIG. 15, the TMGI may include an MBMS service ID, a mobile country code (MCC), and a mobile network code (MNC).

The MBMS service ID may consist of 3 octets. The MBMS service ID may have a hexadecimal number with a 6-digit fixed length between "000000" and "FFFFFF". The MBMS service ID uniquely identifies an MBMS bearer service within a PLMN.

In cases where a UE belongs to a specific GSC group and performs a group call and the corresponding group call includes an MBMS bearer, the UE receives a TMGI for the corresponding group call from a network through the GC1 interface. That is, the GCS group may be mapped to the TMGI.

The mobile country code (MCC) may be consist of 3 digits. The MCC uniquely identifies a domicile country of the BM-SC.

The mobile network code (MNC) may consist of 2 or 3 digits. The MNC identifies a PLMN to which the BM-SC belongs.

Cell Granularity Reporting Method

The present invention proposes a method for a network to recognize a location of a UE in an idle mode by cell granularity. In particular, the present invention may be used to improve an effective operation generated as the existing multimedia broadcast multicast service (MBMS) technique proposed for broadcasting is used for the purpose of group communication and group messaging for an MTC device. Also, the present invention proposes a method for a network to recognize cell granularity regardless of idle mode or connected mode of a UE when monitoring an MTC device, so as to be used for more applications.

FIG. 16 is a view illustrating an MBSFN area in a wireless communication to which the present invention is applicable.

Referring to FIG. 16, an MBSFN area 0 includes cell 1 to cell 7, an MBSFN area 1 may include cell 7, cell 9, cell 10, and cell 13, and an MBSFN area 255 may include cell 8, cell 9, and cell 11 to cell 15.

Among cells that belong to the MBSFN area 0, cell 4 is an MBSFN area reserved cell, which belongs to the MBSFN area but does not support MBMS transmission.

Cell 7, cell 8, and cell 9 are cells that belong to one or more MBSFN areas. One cell may belong to up to eight MBSFN areas.

As discussed above, the existing MBMS scheme is operated in an MBSFN area form that an area called a service area (SA) configured and multiple eNBs broadcast the same content in synchronization. Here, the SA, static information, may be changed by an operation of a provider but is not required to be changed frequently or in real time.

However, as discussed above, as a group communication (Release-12 GCSE) (please refer to 3GPP TS 22.468 and TS 23.468) scheme is introduced to a 3GPP LTE/LTE-A technique, and also, as such group communication borrows the existing MBMS technique, the same inefficiency problem of the existing MBMS which is static and broadcast by synchronizing a plurality of cells has been raised.

Thus, a scheme a network to more effectively recognize information of a location of a UE and a group to which the UE belongs and operate MBMS delivery by cell granularity has been proposed (please refer to 3GPP TR.23.768 Solution 2).

According to this solution, unless the number of users within the same group within the same cell to operate MBMS delivery by cell granularity is not significantly large (in cases where the use of an eMBMS is triggered in a corresponding cell), a unicast bearer may be used to distribute downlink data. This will be described with reference to FIG. 17.

FIG. 17 is a view illustrating cell granularity MBMS transmission in a wireless communication system to which the present invention is applicable.

In FIG. 17, it is assumed that four cells belong the same MBSFN area.

As illustrated in FIG. 17(*a*), in cases where an MBMS service is provided by MBSFN area, although a cell to which a UE receiving an MBMS does not belong is present among cells that belong to an MBSFN area, a cell (excluding an MBSFN area reserved cell) that belongs to the MBSFN area performs MBMS transmission.

Meanwhile, when performing corresponding MBMS broadcasting is ineffective in a cell to which a UE receiving an MBMS does not belong according to the aforementioned solution, corresponding resource may be unicast and used for other purposes as illustrated in FIG. 17(b).

In general, a UE which transmits and receives a signal with a network (e.g., an eNB, etc.) is in an ECM-CONNECTED state and the eNB recognizes information of a cell in which the UE is positioned, and thus, a method (e.g., user location change reporting, etc.) for reporting a change in a cell when the UE changes a cell in which the UE is camping has been proposed.

However, a UE which receives broadcast data using an MBMS is able to receive data uni-directionally even in an ECM-IDLE state. In this case, however, since the UE does not have a dedicated connection with the eNB, it is impossible for the network to obtain accurate location information of the UE, i.e., cell change information through the existing defined method.

In particular, in cases where the network determines whether to perform transmission by MBMS delivery or unicast delivery (i.e., whether to transmit specific information to N number of UEs in a broadcast manner using an MBMS bearer or whether to transmit specific information to N number of UEs using N number of unicast bearers), although a UE even in an ECM-IDLE state should be included in the determination when the UE receives the corresponding MBMS bearer, and thus, when the UE in the ECM-IDLE state changes a cell, a method for the network to recognize the change in the cell is required.

That is, when N number of UEs receive an MBMS bearer in an ECM-IDLE state in a cell A, preferably, the N number of UEs maintain the corresponding MBMS bearer, but in cases where the corresponding UEs moved to the outside of the cell or only a small number of UEs such as one UE or two UEs belong to the cell A, it may be more effective to release the MBMS bearer or transmit the corresponding data in a unicast manner, in the aspect of resource management.

Also, in the case of group communication/group messaging, there is a high possibility that a UE group belongs to a specific cell. In this case, preferably, group communication/messaging service is provided through an MBMS only in the cell to which the UE group belongs. Thus, in cases where a UE in the ECM-IDLE state is provided with a group communication/group messaging service through the corresponding MBMS, a method for the network to recognize a location of a UE by cell granularity is required.

Also, when a specific application (e.g., an MTC application) wants to recognize the number of UEs that belong to a certain cell, the number of UEs in the ECM-IDLE state should be recognized to accurately recognize the number of UEs that belong to the corresponding cell. According to the existing scheme, in order to recognize the number of UEs in the ECM-IDLE state, a UE should be waken up by transmitting paging.

Also, when paging is intended to be transmitted to a specific UE in the ECM-IDLE state for the reason of an incoming call, or the like, since the network does not know a location of the corresponding UE by cell granularity, the network should transfer paging for the corresponding UE to a cell that belongs to a tracking area the corresponding UE has most recently reported.

Also, in particular, a 3GPP core network should be able to provide the following information to a UE served by a third party service provider, among requirements required in the current Rel-13 monitoring enhancement (MONTE) (please refer to 3GPP TS 22.101 exposed service and capabilities).

Indication of a roaming state (i.e., roaming and no roaming) and a serving network when a UE starts/stops roaming.

Loss of connectivity of UE change or loss in association between mobile equipment (ME) and universal IC card (UICC)

Communication failure event of UE (e.g., troubleshooting)

Report when a UE moves in to or moves out from a geographical area indicated by a third party Report when a UE changes a routing area/tracking area/location area/cell In order to monitor a change in a cell level among the aforementioned requirements, a method for recognizing a location of a UE in an idle mode (e.g., an ECM-IDLE) is required.

Thus, the present invention proposes a method for a network to recognize a location of a terminal in an idle state by cell granularity.

Hereinafter, in descriptions of the present invention, a cell to which a UE belongs and a cell in which UE camps may be interpreted as having the same meaning. Also, a cell to which a UE belongs and a cell in which a UE camps may refer to a cell selected by a UE in an idle state (i.e., ECM-IDLE/RRC-IDLE) by completing a cell selection/reselection procedure.

In an embodiment of the present invention, when cell level reporting (or cell granularity reporting) is required for a specific UE (or a UE group), a network may command (or configure) a corresponding UE (or UE group) about cell level reporting (hereinafter, it may be designated as "cell level reporting configuration" or "cell level/reporting configuration") through an attach procedure and tracking area update (TAU)/routing area update (RAU) procedure, and the like. That is, the UE may report cell change information to the network using the existing TAU procedure.

Here, the cell level reporting configuration may be dedicatedly transmitted to UE(s) for receiving a group communication service, MTC terminal(s), or UEs determined according to characteristics (e.g., a UE with low mobility, etc.) of UEs.

The network may request (or configure) cell level reporting from a UE (or a UE group) as necessary. For example, the following two cases may be included.

A case in which MBMS delivery and unicast delivery are intended to be flexibly operated by cell level (i.e., cell granularity) to ensure an effective operation of a group call and group-based messaging A case in which an application server wants to monitor a change in a location of a UE by cell granularity For example, cell level reporting configuration may include a parameter regarding whether an MBMS is received. A UE (or a UE group) performing cell level reporting may be determined on the basis of a parameter value regarding whether an MBMS is received. This will be described hereinafter.

In another example, the cell level reporting configuration may include a parameter regarding a specific time (or timer). A timing at which the UE (or the UE group) performs cell level reporting may be determined on the basis of a parameter value regarding the specific time (or timer). Details thereof will be described hereinafter.

When a cell to which a UE belongs is changed, the change in the cell or information of a cell to which the corresponding UE belongs may be reported (or informed) to the network (i.e., the MME) through an eNB) using the existing TAU procedure. This will be described with reference to the following drawing.

The TAU procedure may be classified to a case in which a UE triggers the TAU on the basis of a specific condition and a periodic TAU for maintaining reachability of a UE. Here, the condition in which a UE triggers the TAU is varied such as a case in which a tracking area to which a UE belongs is changed, or the like.

Also, the TAU procedure may be classified into a case in which an MME to which a UE belongs is changed, a case in which an S-GW is changed, or a case in which two nodes are changed.

FIG. 18 is a view illustrating a cell granularity reporting method according to an embodiment of the present invention.

Referring to FIG. 18, when cell granularity/level reporting is configured (i.e., when cell granularity/level reporting configuration is received) through an attach procedure or a TAU/RAU procedure, the UE performs an operation of detecting whether a cell in which the UE is camping in an IDLE mode period has been changed (S1801).

That is, upon receiving the cell granularity/level reporting configuration, the UE detects whether a cell in which the UE is camping in an IDLE state has been changed.

Also, additionally, the cell level reporting configuration (or the cell level configuration) may include one or more of following parameters (or information).

Whether to receive MBMS (that is, indicating whether to receive MBMS)

A UE (or a UE group) performing cell level reporting may be determined on the basis of the parameter (information). That is, an indication regarding whether an MBMS is received indicates whether a condition regarding whether an MBMS is received is applied in order for a UE (or a UE group) performing cell granularity/level reporting to determine whether to perform cell granularity/level reporting.

For example, the indication regarding whether an MBMS is received may be activated ("Yes") or deactivated ("No"). For example, in cases where the indication regarding whether an MBMS is received is activated ("Yes"), only when there is an MBMS received in the IDLE period (that is, only a UE receiving the MBMS), the UE may perform cell granularity/level reporting. Meanwhile, in cases where the indication regarding whether an MBMS is received is deactivated ("No"), every UE (that is, every UE which has received the cell granularity/level reporting configuration) may perform cell granularity/level reporting, regardless of reception of an MBMS.

Here, receiving an MBMS may refer to that a UE detects MBMS data (or signal) in a radio frequency (RF) unit. That is, when MBMS data (or signal) is detected, irrespective of a TMGI designated to the UE itself (or designated to a group to which the terminal belongs), the UE may determine that MBMS is received.

Also, receiving an MBMS may refer to receiving MBMS data (or signal) in an MTCH corresponding to a TMGI designated to the UE itself (or designated in a group to which the UE belongs). That is, when MBMS data (or signal) corresponding to the TMGI designated to the UE itself (or designated in the group to which the UE belongs) is received, the UE may determine that MBMS is received.

Timer information (i.e., indicating a timer value)

On the basis of this parameter (information), a timing at which the UE performs cell granularity/level reporting is performed or whether to perform cell granularity/level reporting may be determined.

Here, a timer corresponds to a period value, and although the cell in which the UE is camping is changed, the UE may not report information regarding a changed cell (that is, cell to which the UE currently belongs) to the network until a timer value expires. That is, when the UE detects the change in the cell when the timer value expires, the UE transmits cell change information to the network.

Here, the timer may be driven from a timing at which the UE receives timer information from the network through an attach procedure of the TAU procedure (or from a timing at which the network transmits a timer parameter). Since the timer is driven from the timing at which the UE receives timer information, the network may advantageously recognize the number of UEs in an IDLE state that belong to the specific cell within a specific time from a timing at which the network transmits the cell granularity/level reporting configuration.

Or, the timer may be driven from a timing at which the UE transitions from a CONNECTED state to an IDLE state. Upon receiving the time information through the attach procedure, the UE may be in the CONNECTED state, and since the UE in the CONNECTED state is reported by cell granularity to the network, the UE in the CONNECTED state advantageously does not drive the timer unnecessarily.

Or, the timer may be driven from a timing at which the UE receives an MBMS. In this case, when the indication regarding whether to receive MBMS is activated ("Yes"), a UE other than the UE receiving the MBMS does not advantageously drive the timer unnecessarily.

Or, the timer may be driven from a timing at which it is determined that a cell in which the UE is camping is changed. Since the timer is driven from the timing at which the cell in which the UE is camping is changed, the network may recognize the number of UEs which have stayed in a specific cell for a predetermined period of time and may advantageously exclude the number of UEs which are positioned in a cell boundary and ping-ponged between cells.

Or, the timer value may be arbitrarily determined. In particular, the timer value may be arbitrarily determined within a different range according to an indication value regarding whether an MBMS is received. For example, when a parameter value regarding whether an MBMS is received is "Yes", the timer value may be determined within a range from 10 ms to 20 ms, but when the parameter value is "No", the timer value may be determined within a range from 30 ms to 50 ms.

Also, the timer value may correspond to a period in which the network calculates switching between MBMS delivery and unicast delivery.

In step S1801, when it is detected that a cell in which the UE is camping is changed, the UE transmits a TAU request message including cell change information to the eNB (S1802).

Here, the cell change information may include information indicating that the cell in which the UE is camping has been changed and/or a cell identity of the cell in which the UE is camping.

Here, as described above, in cases where the cell level reporting configuration includes an indication regarding whether an MBMS is received and/or timer information, when the UE detects that the cell to which the UE belongs is changed, the UE may transmit a TAU request message to the eNB on the basis of a parameter (or information) included in the cell level reporting configuration.

The eNB includes cell change information in the received TAU request message and transfers the TAU request message to the MME (S1803).

Here, the cell change information may include information indicating that the cell in which the UE is camping has been changed and/or a cell identity of the cell in which the UE is camping.

In step S1802 mentioned above, the UE may include the information indicating that the cell has been changed and/or the cell identity of the cell in which the UE is camping in the TAU request message and transmit the same to the eNB, and here, the eNB may include the same information in the TAU request message and transmit the same to the MME.

Also, in step S1802, the UE may include only the information indicating that the cell has been changed in the TAU request message and transmit the same to the eNB, and here, the eNB may include the cell identity of the cell in which the UE is camping (and together with the information indicating that the cell has been changed) in the TAU request message and transmit the same to the MME.

Also, in step S1802, the UE may include only the information indicating that the cell has been changed in the TAU request message and transmit the same to the eNB, and the eNB may transmit the TAU request message received from the UE to the MME. That is, the eNB may capsulate the TAU request message in an initial UE message and transmit the same to the MME, and the cell identity of the cell received by the eNB may be included in the initial UE message and the cell identity may not be included in the TAU request message.

The MME compares the cell ID included in the TAU request message with a previous cell ID regarding the corresponding UE, and when the cell ID has been changed, the MME transmits the changed cell ID to the network through an S-GW and a P-GW. Here, in cases where the changed cell ID of the UE is finally transmitted to a PCRF, the change in the cell of the corresponding UE may also be informed to the application server.

An existing TAU procedure is performed (S1804) (please refer to 3GPP TS 23.401).

That is, the existing TAU procedure may be performed after the MME receives the TAU request message from the eNB and before a TAU accept message is transmitted to the UE, but a message transmitted by the MME to the SGW, a message transmitted by the SGW to the PGW, and a message transmitted by the MME to the HSS may include the changed cell ID of the UE.

Here, the existing TAU procedure includes a TAU procedure in cases where the MME to which the UE belongs is c hanged, in cases where the S-GW is changed, or in cases where two nodes are changed. Details thereof will be descried hereinafter.

The MME transmits a TAU accept message to the UE (S1805).

Here, the MME may configure the cell level reporting again. That is, the MME may include the cell level reporting configuration in the TAU accept message and transmit the same to the eNB.

The procedure illustrated in FIG. 18 is merely illustrative and a step or an entity not illustrated in FIG. 18 may be added to perform the cell granularity reporting method.

FIG. 19 is a view illustrating a cell granularity reporting method according to an embodiment of the present invention.

In FIG. 19, the cell granularity reporting method according to FIG. 18 when an SGW is changed is specifically illustrated.

Referring to FIG. 19, when cell granularity/level reporting configuration is received through an attach procedure or a TAU/RAU procedure, the UE performs an operation of detecting whether a cell in which the UE is camping in an IDLE mode period has been changed (S1901).

That is, upon receiving the cell granularity/level reporting configuration, the UE detects whether a cell in which the UE is camping in an IDLE state has been changed.

Here, as described above with reference to FIG. 18, the cell level reporting configuration (or cell level configuration) may include one or more of indicating whether an MBMS is received and/or timer information, and here, the same descriptions will be omitted.

In step S1901, when it is detected that a cell in which the UE is camping is changed, the UE transmits a TAU request message including cell change information to the eNB (S1902).

Here, the cell change information may include information indicating that the cell in which the UE is camping has been changed and/or a cell identity of the cell in which the UE is camping.

Here, as described above, in cases where the cell level reporting configuration includes an indication regarding whether an MBMS is received and/or timer information, when the UE detects that the cell to which the UE belongs is changed, the UE may transmit a TAU request message to the eNB on the basis of a parameter (or information) included in the cell level reporting configuration.

The eNB includes cell change information in the received TAU request message and transfers the TAU request message to the MME (S1903).

Here, the cell change information may include information indicating that the cell in which the UE is camping has been changed and/or a cell identity of the cell in which the UE is camping.

In step S1902 mentioned above, the UE may include the information indicating that the cell has been changed and/or the cell identity of the cell in which the UE is camping in the TAU request message and transmit the same to the eNB, and here, the eNB may include the same information in the TAU request message and transmit the same to the MME.

Also, in step S1902, the UE may include only the information indicating that the cell has been changed in the TAU request message and transmit the same to the eNB, and here, the eNB may include the cell identity of the cell in which the UE is camping (and together with the information indicating that the cell has been changed) in the TAU request message and transmit the same to the MME.

Also, in step S1902, the UE may include only the information indicating that the cell has been changed in the TAU request message and transmit the same to the eNB, and the eNB may transmit the TAU request message received from the UE to the MME. That is, the eNB may capsulate the TAU request message in an initial UE message and transmit the same to the MME, and the cell identity of the cell received by the eNB may be included in the initial UE message and the cell identity may not be included in the TAU request message.

In cases where the MME is changed, a new MME transmits a context request message to an old MME in order to retrieve user information (S1904).

In cases where the MME is changed, the old MME transmits a context response message to the new MME in response to the context request message (S1905).

An authentication/security procedure is performed between the UE and the MME and between the MME and the HSS (S1906).

In cases where the MME is changed, the new MME transmits a context acknowledge message to the old MME (S1907).

Here, the MME (the new MME when changed) determines whether the SGW is relocated. When the old SGW is not able to serve the corresponding UE any longer, the SGW is relocated. The MME (new MME, when changed) may relocate the SGW when the new SGW is anticipated to serve the corresponding UE for a longer period of time, when the new SGW is anticipated to have a more appropriate path to the PGW with the corresponding UE, or when the new SGW is co-located with the PGW. Selection of a new SGW may refer to the 3GPP TS 23.401 paragraph.

The MME (new MME, when changed) transmits a create session request message to the new SGW (S1908).

Here, the create session request message may include information indicating that the cell in which the UE is camping has been changed and/or the cell identity of the cell in which the UE is camping.

The new SGW transmits a modify bearer request message to the PGW per PDN connection (S1909).

Here, the modify bearer request message may include the information indicating that the cell in which the UE is camping has been changed and/or the cell identity of the cell in which the UE is camping.

The PGW transmits a modify bearer response message to the new SGW in response to the modify bearer request message (S1910)

Here, the PGW may report the change in the location of the UE to the PCRF. As described above, in cases where the changed cell ID of the UE is finally transmitted to the PCRF, the change in the cell of the corresponding UE may also be informed to the application server.

The new SGW transmits a create session response message to the MME (new MME, when changed) in response to the create session request message (S1911).

When the MME is changed, the new MME transmits an update location request message to the HSS (S1912).

Here, the update location request message may include the changed cell ID value of the UE.

When the MME is changed, the HSS transmits a cancel location message to the old MME (S1913).

When the MME is changed, the old MME transmits a cancel location acknowledge (Ack) message to the HSS in response to the cancel location message (S1914).

When the MME is changed, the HSS transmits an update location acknowledge (Ack) message to the new MME in response to the update location request message (S1915).

When the MME is changed, the old MME transmits a delete session request message to the old SGW (S1916).

Here, when the MME has not been changed, release of a bearer resource in the old SGW is triggered.

The old SGW transmits a delete session response message to the old MME in response to the delete session request message (S1917).

The MME (new MME, when changed) transmits a TAU accept message to the UE in response to the TAU request message (S1918).

Here, the MME may configure the cell level reporting again. That is, the MME may include a cell level reporting configuration in the TAU accept message and transmit the same to the UE through the eNB.

Meanwhile, when the MME has not been changed, steps S1904, S1905, S1907, and S1913 to S1915 may be omitted.

The procedure illustrated in FIG. 19 is merely illustrative and a step or an entity not illustrated in FIG. 19 may be added to perform the cell granularity reporting method.

FIG. 20 is a view illustrating a cell granularity reporting method according to an embodiment of the present invention.

In FIG. 20 the cell granularity reporting method according to FIG. 18 when an SGW is not changed is specifically illustrated.

Referring to FIG. 20, when cell granularity/level reporting configuration is received through an attach procedure or a TAU/RAU procedure, the UE performs an operation of detecting whether a cell in which the UE is camping in an IDLE mode period has been changed (S2001).

That is, upon receiving the cell granularity/level reporting configuration, the UE detects whether a cell in which the UE is camping in an IDLE state has been changed.

Here, as described above with reference to FIG. 18, the cell level reporting configuration (or cell level configuration) may include one or more of indicating whether an MBMS is received and/or timer information, and here, the same descriptions will be omitted.

In step S2001, when it is detected that a cell in which the UE is camping is changed, the UE transmits a TAU request message including cell change information to the eNB (S2002).

Here, the cell change information may include information indicating that the cell in which the UE is camping has been changed and/or a cell identity of the cell in which the UE is camping.

Here, as described above, in cases where the cell level reporting configuration includes an indication regarding whether an MBMS is received and/or timer information, when the UE detects that the cell to which the UE belongs is changed, the UE may transmit the TAU request message to the eNB on the basis of a parameter (or information) included in the cell level reporting configuration.

The eNB includes cell change information in the received TAU request message and transfers the TAU request message to the MME (S2003).

Here, the cell change information may include information indicating that the cell in which the UE is camping has been changed and/or a cell identity of the cell in which the UE is camping.

In step S2002 mentioned above, the UE may include the information indicating that the cell has been changed and/or the cell identity of the cell in which the UE is camping in the TAU request message and transmit the same to the eNB, and here, the eNB may include the same information in the TAU request message and transmit the same to the MME.

Also, in step S2002, the UE may include only the information indicating that the cell has been changed in the TAU request message and transmit the same to the eNB, and here, the eNB may include the cell identity of the cell in which the UE is camping (and together with the information indicating that the cell has been changed) in the TAU request message and transmit the same to the MME.

Also, in step S2002, the UE may include only the information indicating that the cell has been changed in the TAU request message and transmit the same to the eNB, and the eNB may transmit the TAU request message received from the UE to the MME. That is, the eNB may capsulate the TAU request message in an initial UE message and transmit the same to the MME, and the cell identity of the cell received by the eNB may be included in the initial UE message and the cell identity may not be included in the TAU request message.

In cases where the MME is changed, a new MME transmits a context request message to an old MME in order to retrieve user information (S2004).

In cases where the MME is changed, the old MME transmits a context response message to the new MME in response to the context request message (S2005).

An authentication/security procedure is performed between the UE and the MME and between the MME and the HSS (S2006).

In cases where the MME is changed, the new MME transmits a context acknowledge message to the old MME (S2007).

When the MME is changed, the new MME transmits a modify bearer request message to the SGW by PDN connections (S2008).

Here, the modify bearer request message may include information indicating that the cell in which the UE is camping has been changed and/or a cell identity of the cell in which the UE is camping.

The SGW transmits a modify bearer request message to the PGW per PDN connection (S2009).

Here, the modify bearer request message may include the information indicating that the cell in which the UE is camping has been changed and/or the cell identity of the cell in which the UE is camping.

The PGW transmits a modify bearer response message to the SGW in response to the modify bearer request message (S2010)

Here, the PGW may report the change in the location of the UE to the PCRF. As described above, in cases where the changed cell ID of the UE is finally transmitted to the PCRF, the change in the cell of the corresponding UE may also be informed to the application server.

The SGW transmits a modify bearer response message to the new MME in response to the modify bearer request message (S2011).

When the MME is changed, the new MME transmits an update location request message to the HSS (S2012).

Here, the update location request message may include the changed cell ID value of the UE.

When the MME is changed, the HSS transmits a cancel location message to the old MME (S2013).

When the MME is changed, the old MME transmits a cancel location acknowledge (Ack) message to the HSS in response to the cancel location message (S2014).

When the MME is changed, the HSS transmits an update location acknowledge (Ack) message to the new MME in response to the update location request message (S2015).

The MME (new MME, when changed) transmits a TAU accept message to the UE in response to the TAU request message (S2016).

Here, the MME may configure the cell level reporting again. That is, the MME may include a cell level reporting configuration in the TAU accept message and transmit the same to the UE through the eNB.

Meanwhile, when the MME has not been changed, steps S2004, S2005, S2007, and S2008 to S2015 may be omitted.

The procedure illustrated in FIG. 20 is merely illustrative and a step or an entity not illustrated in FIG. 20 may be added to perform the cell granularity reporting method.

Also, in another embodiment of the present invention, when a cell to which the UE belongs is changed, whether the cell has been changed and information of the cell to which the corresponding UE belongs may be reported (or notified) to the network (i.e., to the MME through the eNB) using a new procedure. This will be described with reference to FIG. 21.

That is, the UE in an IDLE state may transmit cell change information to the network through a procedure simpler than the procedure using the TAU procedure. This may be implemented using the existing TAU request message and including indication information requesting a simplified procedure or through a new message (e.g., a cell change request message). This will be described with reference to FIG. 21.

FIG. 21 is a view illustrating a cell granularity reporting method according to an embodiment of the present invention.

Referring to FIG. 21, when cell granularity/level reporting is configured (i.e., when cell granularity/level reporting configuration is received) through an attach procedure or a TAU/RAU procedure, the UE performs an operation of detecting whether a cell in which the UE is camping in an IDLE mode period has been changed (S2101).

That is, upon receiving the cell granularity/level reporting configuration, the UE detects whether a cell in which the UE is camping in an IDLE state has been changed.

Here, as described above with reference to FIG. 18, the cell level reporting configuration (or cell level configuration) may include one or more of indicating whether an MBMS is received and/or timer information, and here, the same descriptions will be omitted.

In step S2101, when it is detected that a cell in which the UE is camping is changed, the UE transmits a cell change report message (or a TAU request message including indication information indicating a simplified TAU procedure together with cell change information) to the eNB (S2102).

Here, the cell change information may include information indicating that the cell in which the UE is camping has been changed and/or a cell identity of the cell in which the UE is camping.

Here, as described above, in cases where the cell level reporting configuration includes an indication regarding whether an MBMS is received and/or timer information, when the UE detects that the cell to which the UE belongs is changed, the UE may transmit the cell change report message (or the TAU request message) to the eNB on the basis of a parameter (or information) included in the cell level reporting configuration.

The eNB includes cell change information in the received cell change report message (or the TAU request message) and transfers the cell change report message (or the TAU request message) to the MME (S2103).

Here, the cell change information may include information indicating that the cell in which the UE is camping has been changed and/or a cell identity of the cell in which the UE is camping.

In step S2102 mentioned above, the UE may include the information indicating that the cell has been changed and/or the cell identity of the cell in which the UE is camping in the cell change report message (or the TAU request message) and transmit the same to the eNB, and here, the eNB may include the same information in the cell change report message (or the TAU request message) and transmit the same to the MME.

Also, in step S2102, the UE may include only the information indicating that the cell has been changed in the cell change report message (or the TAU request message) and transmit the same to the eNB, and here, the eNB may include the cell identity of the cell in which the UE is camping (and together with the information indicating that the cell has been changed) in the cell change report message (or the TAU request message) and transmit the same to the MME.

Also, in step S2102, the UE may include only the information indicating that the cell has been changed in the cell change report message (or the TAU request message) and transmit the same to the eNB, and the eNB may transmit the cell change report message (or the TAU request message) received from the UE to the MME. That is, the eNB may capsulate the cell change report message (or the TAU request message) in an initial UE message and transmit the same to the MME, and the cell identity of the cell received by the eNB may be included in the initial UE message and the cell identity may not be included in the cell change report message (or the TAU request message).

When the cell change report message is received, the MME stores whether the cell ID has been changed and the cell ID value and subsequently transmits a cell change report acknowledge (Ack) message to the eNB (S2104).

Or, in cases where the MME recognizes that the received TAU request message is a message for a simplified TAU procedure for cell granularity/level reporting, the MME may store whether the cell ID has been changed and the cell ID value, without performing a follow-up TAU operation, and subsequently transmits a TAU accept message to the eNB.

Here, the MME may configure the cell level reporting again. That is, the MME may include a cell level reporting configuration in the cell change report acknowledge message (or the TAU accept message) and transmit the same to the eNB.

Also, the MME may transmit whether a cell of the corresponding UE has been changed and corresponding cell information to the application server through a PCRF, through the S-GW and P-GW.

The eNB transmits the cell change report acknowledge (or the TAU accept message) received from the MME to the UE (S2105).

As described above, the cell change report acknowledge (or the TAU accept message) may include the newly configured cell level reporting configuration.

Also, in another embodiment of the present invention, when the embodiment in accordance with FIGS. 18 to 21 is cell granularity/level reporting of an EPC level, the same cell granularity/level reporting operation of the UE may also be performed at an application level.

First, the application server commands (or instructs) the UE to perform cell granularity/level reporting (that is, transmit a cell granularity/level reporting configuration).

Here, as described with reference to FIG. 18, the cell level reporting configuration (or cell level configuration) may include one or more of the indication regarding whether an MBMS is received and/or timer information as described above, and here, the same descriptions will be omitted.

The application server (e.g., the GCS AS) may transmit the cell granularity/level reporting configuration through a GC1 interface, or the like, used for application signaling in group communication.

An application layer of the UE sets a modem of the UE to detect a cell change in the case of performing cell granularity/level reporting. Thus, the modem of the UE (i.e., access stratum, non-access stratum) detects a cell change and subsequently transmits cell change information to the application layer.

That is, upon receiving the cell granularity/level reporting configuration, the UE detects whether a cell in which the UE is camping in an IDLE state is changed.

Thereafter, the application layer of the UE starts data transmission to transmit corresponding information, and after requesting a service request, the application layer of the UE establishes a user plane connection with the application server and transmits cell change information.

Here, the cell change information may include information indicating that the cell in which the UE is camping has been changed and/or a cell identity of the cell in which the UE is camping.

Here, as described above, in cases where the cell level reporting configuration includes an indication regarding whether an MBMS is received and/or timer information, when the UE detects that the cell to which the UE belongs is changed, the UE may transmit cell change information to the application server on the basis of the parameter (or information) included in the cell level reporting configuration.

The cell granularity/level reporting for monitoring an IDLE UE is proposed to manage an MTC type terminal by a third party application, and here, since there is a high possibility that the corresponding UE is in the IDLE mode during a communication-available period, the cell granularity/level reporting of the UE in the IDLE state is required.

FIG. 22 is a view illustrating a cell granularity reporting method according to an embodiment of the present invention.

Referring to FIG. 22, the UE receives a cell granularity reporting configuration from the network (S2201).

Here, the UE may receive the cell granularity reporting configuration from the network within an attach procedure or a TAU procedure.

Here, the cell granularity reporting configuration refers to a configuration for the UE to command (or instruct) cell granularity reporting.

In addition, the cell level reporting configuration (or cell level configuration) may include one or more of the following parameters (or information).

Additionally, the cell level reporting configuration (or the cell level configuration) may include one or more of following parameters (or information).

Whether MBMS is received (that is, indication regarding whether MBMS is received)

A UE (or a UE group) performing cell level reporting may be determined on the basis of the parameter (information). That is, an indication regarding whether an MBMS is received indicates whether a condition regarding whether an MBMS is received is applied in order to determine by a UE (or a UE group) performing cell granularity/level reporting.

For example, the indication regarding whether an MBMS is received may be activated ("Yes") or deactivated ("No"). For example, in cases where the indication regarding whether an MBMS is received is activated ("Yes"), only when there is an MBMS received in the IDLE period (that is, only a UE receiving the MBMS), the UE may perform cell granularity/level reporting. Meanwhile, in cases where the indication regarding whether an MBMS is received is deactivated ("No"), every UE (that is, every UE which has received the cell granularity/level reporting configuration) may perform cell granularity/level reporting, regardless of reception of an MBMS.

Here, receiving an MBMS may refer to that a UE detects MBMS data (or signal) in a radio frequency (RF) unit. That is, when MBMS data (or signal) is detected, irrespective of a TMGI designated to the UE itself (or designated to a group to which the terminal belongs), the UE may determine that MBMS is received.

Also, receiving an MBMS may refer to receiving MBMS data (or signal) in an MTCH corresponding to a TMGI designated to the UE itself (or designated in a group to which the UE belongs). That is, when MBMS data (or signal) corresponding to the TMGI designated to the UE itself (or designated in the group to which the UE belongs) is received, the UE may determine that MBMS is received.

Timer information (i.e., indicating a timer value)

On the basis of this parameter (information), a timing at which the UE performs cell granularity/level reporting is performed or whether to perform cell granularity/level reporting may be determined.

Here, a timer corresponds to a period value, and although the cell in which the UE is camping is changed, the UE may not report information regarding a changed cell (that is, cell to which the UE currently belongs) to the network until a timer value expires. That is, when the UE detects the change in the cell when the timer value expires, the UE transmits cell change information to the network.

Here, the timer may be driven from a timing at which the UE receives timer information from the network through an attach procedure of the TAU procedure (or from a timing at which the network transmits a timer parameter). Since the timer is driven from the timing at which the UE receives timer information, the network may advantageously recognize the number of UEs in an IDLE state that belong to the specific cell immediately from a timing at which the network transmits the cell granularity/level reporting configuration.

Or, the timer may be driven from a timing at which the UE transitions from a CONNECTED state to an IDLE state. Upon receiving the time information through the attach procedure, the UE may be in the CONNECTED state, and since the UE in the CONNECTED state is reported by cell granularity to the network, the UE in the CONNECTED state advantageously does not drive the timer unnecessarily.

Or, the timer may be driven from a timing at which the UE receives an MBMS. In this case, when the indication regarding whether an MBMS is received is activated ("Yes"), a UE other than the UE receiving the MBMS does not advantageously drive the timer unnecessarily.

Or, the timer may be driven from a timing at which it is determined that a cell in which the UE is camping is changed. Since the timer is driven from the timing at which the cell in which the UE is camping is changed, the network may recognize the number of UEs which have stayed in a specific cell for a predetermined period of time and may advantageously exclude the number of UEs which are positioned in a cell boundary and ping-ponged between cells.

Or, the timer value may be arbitrarily determined. In particular, the timer value may be arbitrarily determined within a different range according to an indication value regarding whether an MBMS is received. For example, when a parameter value regarding whether an MBMS is received is "Yes", the timer value may be determined within a range from 10 ms to 20 ms, but when the parameter value is "No", the timer value may be determined within a range from 30 ms to 50 ms.

Also, the timer value may correspond to a period in which the network calculates switching between MBMS delivery and unicast delivery.

The UE detects whether a cell in which the UE is camping in an IDLE state is changed (S2202).

That is, upon receiving the cell granularity/level reporting configuration, the UE detects whether the cell in which the UE is camping in an IDLE state is changed.

When it is detected that the cell in which the UE is camping in an IDLE state is changed, the UE transmits cell change information to the network (S2203).

Here, the cell change information may include information indicating that the cell in which the UE is camping has been changed and/or the cell identity of the cell in which the UE is camping.

Here, as described above, in cases where the cell level reporting configuration includes an indication whether an MBMS is received and/or timer information, when the UE detects that the cell to which the UE belongs is changed, the UE may transmit cell change information to the network on the basis of a parameter (or information) included in the cell level reporting configuration.

FIG. 23 is a view illustrating a cell granularity reporting method according to an embodiment of the present invention.

Referring to FIG. 23, the UE receives a cell granularity reporting configuration from the network (S2301).

Here, the UE may receive the cell granularity reporting configuration from the network within an attach procedure or a TAU procedure.

Here, the cell granularity reporting configuration includes an indication regarding whether an MBMS is received. A UE (or a UE group) performing cell level reporting may be determined on the basis of the parameter (information). That is, an indication regarding whether an MBMS is received indicates whether a condition regarding whether an MBMS is received is applied in order to determine by a UE (or a UE group) performing cell granularity/level reporting. For example, the indication regarding whether an MBMS is received may be activated ("Yes") or deactivated ("No").

The UE determines whether the indication regarding whether an MBMS is received within the cell granularity reporting configuration is activated ("Yes) (S2302).

When the indication regarding whether an MBMS is received is activated (i.e., "Yes") in step S2302, the UE determines whether MBMS data (or signal) is received (S2303).

Here, receiving an MBMS may refer to that a UE detects MBMS data (or signal) in a radio frequency (RF) unit. That is, when MBMS data (or signal) is detected, irrespective of a TMGI designated to the UE itself (or designated to a group to which the terminal belongs), the UE may determine that MBMS is received.

Also, receiving an MBMS may refer to receiving MBMS data (or signal) in an MTCH corresponding to a TMGI designated to the UE itself (or designated in a group to which the UE belongs). That is, when MBMS data (or signal) corresponding to the TMGI designated to the UE itself (or designated in the group to which the UE belongs) is received, the UE may determine that MBMS is received.

If, however, when the indication regarding whether an MBMS is received is not activated (i.e., "No") in step S2302, the UE detects whether a cell in which the UE is camping in an IDLE state (S2304).

That is, in cases where the indication regarding whether an MBMS is received is deactivated ("No"), every UE (that is, every UE which has received the cell granularity/level reporting configuration) may perform cell granularity/level reporting, regardless of reception of an MBMS.

In cases where the MBMS data (or signal) is received in step S2303, the UE detects whether the cell in which the UE is camping in an IDLE state is changed (S2304).

That is, in cases where the indication regarding whether an MBMS is received is activated ("Yes"), only when there is an MBMS received in the IDLE period (that is, only a UE receiving the MBMS), the UE may perform cell granularity/level reporting.

Meanwhile, when MBMS data is not received in step S2303, the process is returned to step S2303 and the UE determines whether MBMS data (or signal) is received.

That is, when MBMS data (or signal) is not received, the UE does not perform cell granularity reporting.

When the UE detects that the cell in which the UE is camping is changed, the UE transmits cell change information to the network (S2305).

FIG. 24 is a view illustrating a cell granularity reporting method according to an embodiment of the present invention.

Referring to FIG. 24, the UE receives a cell granularity reporting configuration from the network (S2401).

Here, the UE may receive the cell granularity reporting configuration from the network within an attach procedure or a TAU procedure.

Here, the cell granularity reporting configuration includes timer information. On the basis of a value of the parameter (information), a timing at which the UE performs cell granularity/level reporting is performed or whether to perform cell granularity/level reporting may be determined.

Here, the timer value may correspond to a period in which the network calculates switching between MBMS delivery and unicast delivery.

Also, the timer value may be arbitrarily determined. In particular, the timer value may be arbitrarily determined within a different range according to an indication value regarding whether an MBMS is received.

The UE detects whether the cell in which the UE is camping in an IDLE state is changed (S2402).

The UE determines whether a timer expires (S2403).

When the timer does not expire in step S2403, the process is returned to step S2403 and the UE determines whether the timer expires.

That is, although it is detected that the cell in which the UE is camping is changed, the UE does not report cell change information to the network until the timer value expires.

However, in cases where the timer value expires in step S2403, when the UE detects that the cell in which UE is camping is changed, the UE transmits cell change information to the network (S2404).

Here, the timer may be driven from a timing at which the UE receives timer information from the network through the attach procedure or the TAU procedure (or a timing at which the network transmits the timer parameter).

Or, the timer may be driven from a timing at which the UE transitions from the CONNECTED state to the IDLE state.

Or, the timer may be driven from a timing at which the UE receives an MBMS.

Or, the timer may be driven from a timing at which the UE detects that the cell in which the UE is camping is changed.

FIG. 25 is a view illustrating a cell granularity reporting method according to an embodiment of the present invention.

Referring to FIG. 25, the UE receives a cell granularity reporting configuration from the network (S2501).

Here, the UE may receive the cell granularity reporting configuration from the network within an attach procedure or a TAU procedure.

Here, the cell granularity reporting configuration includes an indication regarding whether an MBMS is received. A UE (or a UE group) performing cell level reporting may be determined on the basis of the parameter (information). That is, an indication regarding whether an MBMS is received indicates whether a condition regarding whether an MBMS is received is applied in order to determine by a UE (or a UE group) performing cell granularity/level reporting. For example, the indication regarding whether an MBMS is received may be activated ("Yes") or deactivated ("No").

Also, the cell granularity reporting configuration includes timer information. On the basis of a value of the parameter (information), a timing at which the UE performs cell granularity/level reporting is performed or whether to perform cell granularity/level reporting may be determined.

Here, the timer value may correspond to a period in which the network calculates switching between MBMS delivery and unicast delivery.

Also, the timer value may be arbitrarily determined. In particular, the timer value may be arbitrarily determined within a different range according to an indication value regarding whether an MBMS is received.

The UE determines whether an indication regarding whether an MBMS is received within the cell granularity reporting configuration is activated ("Yes") (S2502).

When the indication regarding whether an MBMS is received is activated (i.e., "Yes") in step S2502, the UE determines whether MBMS data (or signal) is received (S2503).

Here, receiving an MBMS may refer to that a UE detects MBMS data (or signal) in a radio frequency (RF) unit. That is, when MBMS data (or signal) is detected, irrespective of a TMGI designated to the UE itself (or designated to a group to which the terminal belongs), the UE may determine that MBMS is received.

Also, receiving an MBMS may refer to receiving MBMS data (or signal) in an MTCH corresponding to a TMGI designated to the UE itself (or designated in a group to which the UE belongs). That is, when MBMS data (or signal) corresponding to the TMGI designated to the UE itself (or designated in the group to which the UE belongs) is received, the UE may determine that MBMS is received.

If, however, when the indication regarding whether an MBMS is received is not activated (i.e., "No") in step S2502, the UE detects whether a cell in which the UE is camping in an IDLE state is changed (S2504).

That is, in cases where the indication regarding whether an MBMS is received is deactivated ("No"), every UE (that is, every UE which has received the cell granularity/level reporting configuration) may perform cell granularity/level reporting, regardless of reception of an MBMS.

In cases where the MBMS data (or signal) is received in step S2503, the UE detects whether the cell in which the UE is camping in an IDLE state is changed (S2504).

Meanwhile, when MBMS data is not received in step S2503, the process is returned to step S2503 and the UE determines whether MBMS data (or signal) is received.

That is, when MBMS data (or signal) is not received, the UE does not perform cell granularity reporting.

The UE determines whether a timer expires (S2505).

When the timer does not expire in step S2505, the process is returned to step S2505 and the UE determines whether the timer expires.

That is, although it is detected that the cell in which the UE is camping is changed, the UE does not report cell change information to the network until the timer value expires.

However, in cases where the timer value expires in step S2505, when the UE detects that the cell in which the UE is camping is changed, the UE transmits cell change information to the network (S2506).

Here, the timer may be driven from a timing at which the UE receives timer information from the network through the attach procedure or the TAU procedure (or a timing at which the network transmits the timer parameter).

Or, the timer may be driven from a timing at which the UE transitions from the CONNECTED state to the IDLE state.

Or, the timer may be driven from a timing at which the UE receives an MBMS.

Or, the timer may be driven from a timing at which the UE detects that the cell in which the UE is camping is changed.

Overview of Devices to which the Present Invention can be Applied

FIG. 26 illustrates a block diagram of a communication device according to one embodiment of the present invention.

With reference to FIG. 26, a wireless communication system comprises a network node 2610 and a plurality of UEs 2620.

A network node 2610 comprises a processor 2611, memory 2612, and communication module 2613. The processor 2611 implements proposed functions, processes and/or methods proposed through FIG. 1 to FIG. 25. The processor 2611 can implement layers of wired/wireless interface protocol. The memory 2612, being connected to the processor 2611, stores various types of information for driving the processor 2611. The communication module 2613, being connected to the processor 2611, transmits and/or receives wired/wireless signals. Examples of the network node 2610 include an eNB, MME, HSS, SGW, PGW, application server and so on. In particular, in case the network node 2610 is an eNB, the communication module 2613 can include an Radio Frequency (RF) unit for transmitting/receiving a radio signal.

The UE 2620 comprises a processor 2621, memory 2622, and communication module (or RF unit) 2623. The processor 2621 implements proposed functions, processes and/or methods proposed through FIG. 1 to FIG. 20. The processor 2621 can implement layers of wired/wireless interface protocol. The memory 2622, being connected to the processor 2621, stores various types of information for driving the processor 2621. The communication module 2623, being connected to the processor 2621, transmits and/or receives wired/wireless signals.

The memory 2612, 2622 can be installed inside or outside the processor 2611, 2621 and can be connected to the processor 2611, 2621 through various well-known means. Also, the network node 2610 (in the case of an eNB) and/or the UE 2620 can have a single antenna or multiple antennas.

The embodiments described above are a combination of constituting elements and features of the present invention in particular forms. Unless otherwise specified, each constituting element or feature should be regarded to be selective. Each constituting element or feature can be embodied solely without being combined with other constituting element or feature. It is also possible to construct embodiments of the present invention by combining part of constituting elements and/or features. The order of operations illustrated in the embodiments of the present invention can be changed. Part of a structure or feature of an embodiment can be included by another embodiment or replaced with the corresponding structure or feature of another embodiment. It should be clear that embodiments can also be constructed by combining those claims revealing no explicit reference relationship with one another, or the combination can be included as a new claim in a revised application of the present invention afterwards.

Embodiments according to the present invention can be realized by various means, for example, hardware, firmware, software, or a combination thereof. In the case of hardware implementation, the embodiments of the present invention can be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of firmware or software implementation, methods according to the embodiment of the present invention can be implemented in the form of a module, procedure, or function performing operations described above. Software codes can be stored in a memory unit and executed by a processor. The memory unit, being located inside or outside the processor, can communicate data with the processor through various means known in the fields of the art.

It should be clearly understood by those skilled in the art that the present invention can be realized in a different, particular form as long as the present invention retains the essential features of the present invention. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

INDUSTRIAL APPLICABILITY

In the wireless communication system of this disclosure, an example of the cell granularity reporting method applied to a 3GPP LTE/LTE-A system is described, but the cell granularity reporting method may also be applied to various other wireless communication systems, as well as to the 3GPP LTE/LTE-A system.

While the present invention has been shown and described in connection with the embodiments, it will be apparent to those skilled in the art that modifications and variations can be made without departing from the spirit and scope of the invention as defined by the appended claims.

The invention claimed is:

1. A method for performing cell granularity reporting by a user equipment (UE) in an idle state in a wireless communication system, the method comprising:
receiving a cell granularity reporting configuration including timer information from a network;
driving a timer based on the timer information;
when the UE detect that a cell in which the UE is camping is changed, determining whether the timer expires; and
when the timer expires, transmitting cell change information to the network,
wherein the cell granularity reporting configuration includes an indication regarding whether to receive a multimedia broadcast and multicast service (MBMS), and
when the indication regarding whether an MBMS is received is activated, the UE does not perform the cell granularity reporting unless the UE receives MBMS data.

2. The method of claim 1, wherein in cases where the indication regarding whether an MBMS is received is activated, when the UE receives MBMS data, the UE transmits cell change information to the network.

3. The method of claim 1, wherein whether MBMS data is received is determined by whether MBMS data corresponding to a temporary mobile group identity (TMGI) designated in the UE is received.

4. The method of claim 1, wherein whether MBMS data is received is determined by whether MBMS data is detected by the UE.

5. The method of claim 1, wherein when the indication regarding whether an MBMS is received is not activated, the cell change information is transmitted to the network, regardless of whether MBMS data is received.

6. The method of claim 1, wherein when the timer does not expire, the cell change information is not transmitted to the network although the UE detects that the cell in which the UE is camping is changed.

7. The method of claim 1, wherein the timer is driven at a timing at which the timer information is received, a timing at which the UE transitions from a connected state to an idle state, a timing at which MBMS data is received, or at a timing at which the UE detects that the cell in which the UE is camping is changed.

8. The method of claim 1, wherein the cell change information is transmitted through a tracking area update (TAU) request message or a cell change report message.

9. The method of claim 1, wherein the cell granularity reporting configuration is received during an attach procedure or during a tracking area update (TAU) procedure.

10. The method of claim 1, wherein the cell change information includes information indicating that the cell in which the UE is camping is changed and/or a cell identity of the cell in which the UE is camping.

11. A user equipment (UE) for performing cell granularity reporting in an idle state in a wireless communication system, the UE comprising:
 a radio frequency (RF) unit configured to transmit and receive a wireless signal; and
 a processor configured to:
 control the RF unit to receive a cell granularity reporting configuration including timer information from a network;
 drive a timer based on the timer information;
 determine whether the timer expires, when the UE detects that a cell in which the UE is camping is changed; and
 control the RF unit to transmit cell change information to the network, when the timer expires,
 wherein the cell granularity reporting configuration includes an indication regarding whether to receive a multimedia broadcast and multicast service (MBMS), and
 when the indication regarding whether an MBMS is received is activated, the UE does not perform the cell granularity reporting unless the UE receives MBMS data.

* * * * *